United States Patent
Hamann et al.

(10) Patent No.: US 10,493,800 B2
(45) Date of Patent: Dec. 3, 2019

(54) POLYMER BLEND FOR A TIRE

(71) Applicant: Trinseo Europe GMBH, Horgen (CH)

(72) Inventors: Evemarie Hamann, Halle (DE); Katja Osswald, Weissenfels (DE)

(73) Assignee: TRINSEO EUROPE GMBH, Horgen (CH)

( * ) Notice: Subject to any disclaimer, the term of this patent is extended or adjusted under 35 U.S.C. 154(b) by 88 days.

(21) Appl. No.: 15/551,626

(22) PCT Filed: Feb. 18, 2016

(86) PCT No.: PCT/EP2016/053450
§ 371 (c)(1),
(2) Date: Aug. 17, 2017

(87) PCT Pub. No.: WO2016/131914
PCT Pub. Date: Aug. 25, 2016

(65) Prior Publication Data
US 2018/0037059 A1    Feb. 8, 2018

(30) Foreign Application Priority Data
Feb. 18, 2015  (EP) .................................. 15155547

(51) Int. Cl.
| | | |
|---|---|---|
| B60C 1/00 | (2006.01) |
| C08F 236/06 | (2006.01) |
| C08F 2/38 | (2006.01) |
| C08F 112/08 | (2006.01) |
| C08F 4/48 | (2006.01) |
| C08F 36/00 | (2006.01) |
| C08L 9/00 | (2006.01) |
| C08C 19/25 | (2006.01) |
| C08C 19/44 | (2006.01) |
| C08L 9/06 | (2006.01) |
| C08L 15/00 | (2006.01) |
| C08F 212/08 | (2006.01) |
| C08L 53/02 | (2006.01) |
| C08K 3/22 | (2006.01) |
| C08K 3/36 | (2006.01) |
| C08K 5/18 | (2006.01) |
| C08K 5/548 | (2006.01) |
| C08L 91/00 | (2006.01) |
| C08L 91/06 | (2006.01) |

(52) U.S. Cl.
CPC .............. B60C 1/0016 (2013.01); B60C 1/00 (2013.01); B60C 1/0025 (2013.01); C08C 19/25 (2013.01); C08C 19/44 (2013.01); C08F 2/38 (2013.01); C08F 4/48 (2013.01); C08F 36/00 (2013.01); C08F 112/08 (2013.01); C08F 212/08 (2013.01); C08F 236/06 (2013.01); C08K 3/22 (2013.01); C08K 3/36 (2013.01); C08K 5/18 (2013.01); C08K 5/548 (2013.01); C08L 9/00 (2013.01); C08L 9/06 (2013.01); C08L 15/00 (2013.01); C08L 53/02 (2013.01); C08L 91/00 (2013.01); C08L 91/06 (2013.01)

(58) Field of Classification Search
CPC .......... C08L 91/00; C08L 25/06; C08L 53/02; C08L 15/00; C08L 9/06; C08L 9/00; C08L 91/06; C08C 19/44; C08C 19/25; B60C 1/0016; B60C 1/0025; B60C 1/00; C08K 3/22; C08K 3/36; C08K 5/18; C08K 5/548; C08F 212/08; C08F 36/00; C08F 4/48; C08F 112/08; C08F 2/38; C08F 236/06
USPC ......................................................... 523/157
See application file for complete search history.

(56) References Cited

U.S. PATENT DOCUMENTS

| | | |
|---|---|---|
| 2011/0082253 A1 | 4/2011 | Thiele et al. |
| 2011/0301261 A1 | 12/2011 | Thiele et al. |
| 2012/0316289 A1 | 12/2012 | Thiele et al. |

FOREIGN PATENT DOCUMENTS

| | | |
|---|---|---|
| CN | 101316730 | 12/2008 |
| CN | 102348748 | 2/2012 |
| EP | 2 407 507 A1 | 1/2012 |
| TW | 201002738 | 1/2010 |

OTHER PUBLICATIONS

International Search Report in corresponding International Application No. PCT/EP2016/053450, dated Apr. 19, 2016, 3 pages.
Written Opinion out of corresponding International Application No. PCT/EP2016/053450, dated Apr. 19, 2016, 4 pages.
Office Action issued in App. No. CN201680017219 (dated Jul. 15, 2019).
Search Report issued in TW Appl. No. 105104817 dated Aug. 27, 2019.

Primary Examiner — Angela C Scott
(74) Attorney, Agent, or Firm — Barnes & Thornburg LLP; G. Peter Nichols

(57) ABSTRACT

A polymer blend consisting of (a) 60-96 percent by weight of a high molecular weight elastomeric polymer, (b) 4-35 percent by weight of a low molecular weight aromatic hydrocarbon polymer, and optionally (c) 0-13 percent by weight of an extender oil, wherein the amounts of the components (a), (b) and (c) are based on the total weight of the polymer blend.

16 Claims, No Drawings

POLYMER BLEND FOR A TIRE

This application claims priority to International Application No. PCT/EP2016/053450 filed Feb. 18,2016 and to European Application No. 15155547.1 filed Feb. 18, 2015; the entire contents of each are incorporated herein by reference.

TECHNICAL FIELD

The present invention relates to a polymer blend, consisting of (a) 60 to 96 percent by weight of a high molecular weight elastomeric polymer obtainable by (I) anionic polymerization in the presence of a polymerization initiator in an organic solvent of (I-1) at least one conjugated diene monomer, or (I-2) at least one conjugated diene monomer and one or more α-olefin monomer(s), and optionally (II) modification of the polymer chain ends obtained in (I) by addition and reaction of at least one modification compound represented by formula (1) to formula (3) and/or formula (11) to formula (15), as defined in claim 1 and below, (b) 4 to 35 percent by weight of a low molecular weight aromatic hydrocarbon polymer, and optionally (c) 0 to 13 percent by weight of an extender oil, wherein the amounts of the components (a), (b) and (c) are based on the total weight of the polymer blend.

The present invention also relates to a polymer composition, comprising said polymer blend. In another embodiment, the present invention relates to a method for the preparation of a crosslinked elastomeric polymer, said method comprising (1) providing said polymer blend or said polymer composition; (2) adding one or more filler(s) and optionally at least one or more silane coupling agent(s), and reacting said mixture; and (3) adding one or more vulcanizing agent(s) and optionally one or more vulcanizing accelerator(s) to the mixture of step (2); and cross-linking said mixture. Moreover, the present invention relates to a crosslinked elastomeric polymer obtainable according to said method and an article, comprising either said polymer composition or said crosslinked elastomeric polymer. In addition, use of said polymer blend, said polymer composition or said crosslinked elastomeric polymer for the production of a tire, a tire tread or a tire side wall as well as a polymer kit, comprising said polymer blend or said polymer composition, are described.

Background Art

In recent years, there has been an increasing demand for providing polymer compositions for the production of tires for the automobile industry which allow an improvement of the tire's performance. Particularly, environmental aspects, i.e. reduction of the fuel consumption and/or carbon dioxide emission by reducing the tire's rolling resistance, and safety aspects, i.e. improving the handling stability by increasing the tire's grip performance and abrasion resistance, became more important.

A typical polymer formulation for the manufacturing of a tire includes an aromatic vinyl-conjugated diene copolymer of high molecular weight, such as a styrene butadiene rubber (SBR), which after compounding with several additives, such as a silica filler and a vulcanizing agent, and vulcanization (crosslinking) leads to a tire product having a lower rolling resistance due to the high molecular weight of the SBR component used. Even though providing a tire having an enhanced (lower) rolling resistance is beneficial, the use of an aromatic vinyl-conjugated diene copolymer having a high molecular weight, and for this reason being associated with a high viscosity, results in less beneficial processability in the course of the further processing steps, i.e. compounding and vulcanization (crosslinking) of the corresponding polymer formulations.

Therefore, a high molecular weight aromatic vinyl-conjugated diene copolymer is typically extended with an extender oil of low molecular weight for reducing the copolymer's viscosity and guaranteeing a good mixing, incorporation and distribution of the copolymer in the subsequent compounding and/or crosslinking (vulcanization) steps of the polymer formulation. Typical extender oils (or softeners) are mineral oils and treated mineral oils, such as for example DAE (Distillate Aromatic Extract), TDAE (Treated Distillate Aromatic Extract), MES (Mild Extraction Solvate), RAE (Residual Aromatic Extract) and naphthenic oils. However, there are drawbacks associated with the extension of an aromatic vinyl-conjugated diene copolymer with a standard low molecular weight extender oil:

Since the molecular weight of the common extender oil is relatively low, e.g. about 450 g/mol (converted to polystyrene equivalents) for TDAE, the enhanced processability of the high molecular weight aromatic vinyl-conjugated diene copolymer during the subsequent compounding and vulcanization steps, as mentioned above, is accompanied by a significant increase of the amount of "volatile organic compounds" (herein abbreviated as VOC) in the corresponding final tire product. These VOC emissions become particularly relevant during use of the tire at elevated temperatures.

Another drawback is that the glass temperature and compatibility of these extender oils is more or less fixed and not variable. Thus, when formulating an aromatic vinyl-conjugated diene copolymer, compatibility and subsequent blooming of the extender oil on the vulcanizate surface during storage are relevant factors to be considered. In addition, performance and application field of the vulcanizate, which typically depends on the glass transition temperature, may only be adjusted by variation of the specific composition of the aromatic vinyl-conjugated diene copolymer. However, an increase of the glass transition temperature of the aromatic vinyl-conjugated diene copolymer results in an improved grip performance and a higher rolling resistance, thereby increasing fuel consumption and carbon dioxide emission. On the other hand, reduction of the glass transition temperature of the aromatic vinyl-conjugated diene copolymer results in an improved rolling resistance and a lower fuel consumption of the resulting tire, but unfortunately also leads to a reduced wet grip performance. Another drawback of using a common low molecular weight extender oil is that most of these extender oils are intensely colored, ranging from yellow to deep brown. Accordingly, an intense cleaning of the production plant has to be applied prior to changing polymer grades, particularly if a non-oil extended polymer grade is planned for the next production cycle. Such cleaning procedures are, however, time and cost consuming.

Moreover, the extension of a high molecular weight aromatic vinyl-conjugated diene copolymer with a common extender oil having a low molecular weight results in a less beneficial reduction of the mechanical properties, in particular the modulus, hardness versus handling performance (E' @ 60° C.), increased abrasion loss and decreased rebound resilience at higher temperatures which correspond to a reduced rolling resistance.

Thus, there is a demand for providing alternative extender components as suitable replacement of or in addition to the common extender oils as applied by the prior art, thereby allowing the provision of cross-linked (vulcanized) polymer formulations, which are characterized by having an acceptable or improved processability, while the content of VOC emissions is reduced and a better balance of the dynamic properties of the crosslinked polymer formulations is provided, such as a low hysteresis loss, as represented by a low heat build-up and a low tan δ at 60° C., a reduced compound Mooney viscosity (CMU) and a good grip performance, as represented by a high tan δ at 0° C. (wet grip) and a high tan δ at −10° C. (ice grip), of the crosslinked (vulcanized) polymer formulations and high abrasion resistance, corresponding to a high wet grip, low rolling resistance and high abrasion resistance in the resulting tire products. These needs have been met by the following invention.

SUMMARY OF THE INVENTION

In a first aspect, the present invention therefore relates to a polymer blend, consisting of (a) 60 to 96 percent by weight of an elastomeric polymer, (b) 4 to 35 percent by weight of an aromatic hydrocarbon polymer, and optionally (c) 0 to 13 percent by weight of one or more extender oil(s), wherein the elastomeric polymer is obtainable by (I) anionic polymerization in the presence of a polymerization initiator in an organic solvent of (I-1) at least one conjugated diene monomer, or (I-2) at least one conjugated diene monomer and one or more α-olefin monomer(s), and optionally (II) modification of the polymer chain ends obtained in (I) by addition and reaction of at least one compound represented by formula (1) to formula (3) and/or formula (11) to formula (15), as defined in claim 1; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the aromatic hydrocarbon polymer (b) has a number average molecular weight ($M_n$) of 250 to 1,500 g/mol, and a weight-average molecular weight ($M_w$) of 350 to 2,500 g/mol, and wherein the amounts of the components (a), (b) and (c) are based on the total weight of the polymer blend.

The polymerization initiator used for the anionic polymerization of component (a) may be selected from the group, consisting of n-BuLi, sec-BuLi, tert-BuLi, a compound represented by formula (6) to formula (10), as defined in claim 2, or Lewis base adducts thereof, and/or mixtures thereof.

The at least one conjugated diene monomer may be selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene. The preferred conjugated diene monomers are butadiene and/or isoprene.

The at least one α-olefin monomer may be selected from styrene, 2-methylstyrene, 3-methylstyrene, α-methylstyrene, 2,4-dimethylsytrene, 2,4,6-trimethylstyrene, α-methylstyrene, stilbene, 2,4-diisopropylstyrene,4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, divinylbenzene, a vinylsilane compound of formula (4) or formula (5), as defined in claim 3, and/or mixtures thereof. The preferred α-olefin monomers are styrene, divinylbenzene and the vinylsilane compounds of formula (4) and (5).

The polymer blend according to the invention may include, in particular, a styrene-butadiene-copolymer (herein abbreviated as SBR) or a butadiene polymer (herein abbreviated as BR) as elastomeric polymer component (a) and a polystyrene-polymer as aromatic hydrocarbon polymer (b).

In a second aspect, the present invention provides a polymer composition, comprising the polymer blend of the first aspect of the invention.

The polymer composition of the invention may also comprise one or more filler(s) and optionally one or more vulcanizing agent(s) (or crosslinking agent(s)). In addition, the polymer composition of the invention may also include up to 10 percent by weight of one or more extender oil(s), based on the total weight of the polymer in the polymer composition.

In a third aspect, the present invention provides a method for the preparation of a crosslinked elastomeric polymer, said method comprising the following steps: (1) Providing the polymer blend of the first aspect of the invention or the polymer composition of the second aspect of the invention; (2) Adding one or more filler(s) and optionally one or more silane coupling agent(s); and compounding said mixture; and (3) Adding one or more vulcanizing agent(s) and optionally one or more vulcanizing accelerator(s) to the mixture of step (2); and cross-linking said mixture.

In a fourth aspect, the present invention provides a crosslinked elastomeric polymer obtainable according the third aspect of the invention.

In a fifth aspect, the present invention provides an article, comprising the polymer composition according to the second aspect of the present invention or the crosslinked elastomeric polymer according to the fourth aspect of the invention.

The article according to the invention may be a tire, a tire tread, a tire side wall, a conveyer belt, a seal or a hose.

In a sixth aspect, the present invention relates to the use of (I.1) the polymer blend according to the first aspect of the present invention, (I.2) the polymer composition according to the second aspect of the present invention, or (I.3) the crosslinked elastomeric polymer according to the fourth aspect of the present invention for the production of a tire tread or a tire side wall.

In a seventh aspect, the present invention relates to a polymer kit, comprising (II.1) the polymer blend according to the first aspect of the present invention, or (II.2) the polymer composition according to the second aspect of the present invention.

DETAILED DESCRIPTION OF THE INVENTION

The Polymer Blend

The polymer blend according to the first aspect of the invention exclusively consists of the following components:
Component (a)—an Elastomeric Polymer Having a High Molecular Weight In a first embodiment, component (a) of the polymer blend is an elastomeric polymer having a high molecular weight obtainable by (I) anionic polymerization of (I-1) at least one conjugated diene monomer in the presence of a polymerization initiator in an organic solvent.

In a second embodiment, component (a) of the polymer blend is an elastomeric polymer having a high molecular weight obtainable by (I) anionic polymerization of (I-2) at least one conjugated diene monomer and one or more α-olefin monomer(s) in the presence of a polymerization initiator in an organic solvent.

In a third embodiment, component (a) of the polymer blend is an elastomeric polymer having a high molecular weight obtainable by (I) anionic polymerization of (I-1) at least one conjugated diene monomer in the presence of a polymerization initiator in an organic solvent, and (II) modification of the polymer chains obtained in (I) by addition and reaction of a modifying compound represented by formula (1) to formula (3) and/or formula (11) to formula (15), as defined below.

In a fourth embodiment, component (a) of the polymer blend is an elastomeric polymer having a high molecular weight obtainable by (I) anionic polymerization of (I-2) at least one conjugated diene monomer and one or more α-olefin monomer(s) in the presence of a polymerization initiator in an organic solvent, and (II) modification of the polymer chains obtained in (I) by addition and reaction of a modifying compound represented by formula (1) to formula (3) and/or formula (11) to formula (15), as defined below.

The specific monomer(s) and suitable conditions for the anionic polymerization reaction and the modification reaction, if applicable, are described below in more detail. Further to the following specific disclosure, generally applicable directions on polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer), the amounts of each compound, suitable monomer(s), and suitable process conditions are described in WO 2009/148932, which is entirely incorporated herein by reference.

Conjugated Diene Monomer

Representative conjugated diene monomers include, but are not limited to, 1,3-butadiene, 2-alkyl-1,3-butadiene, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and combinations thereof. Preferred conjugated diene monomers include, but are not limited to, 1,3-butadiene, isoprene, and combinations thereof.

α-Olefin Monomer

In addition to the at least one conjugated diene monomer, one or more α-olefin monomer(s) may optionally be provided for the polymerization of component (a). Suitable examples of α-olefin monomers include, but are not limited to, styrene and its derivatives, including, without limitation, $C_{1-4}$ alkyl substituted styrenes, such as 2-methylstyrene, 3-methylstyrene, α-methylstyrene, 2,4-dimethylstyrene, 2,4,6-trimethylstyrene, α-methylstyrene, and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl) aminostyrene, tert-butoxystyrene, vinylpyridine, divinylbenzene, including 1,2-divinylbenzene, 1,3-divinylbenzene and 1,4-divinylbenzene, a vinylsilane compound of the formula (4) or a multivinylaminosilane compound of formula (5), as defined below, and/or mixtures thereof.

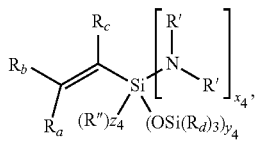

formula (4)

wherein $R_d$ is independently selected from $C_1$-$C_{18}$ hydrocarbyl; R" is selected from $C_1$-$C_6$ hydrocarbyl; $R_a$, $R_b$ and $R_c$ are independently selected from hydrogen, methyl, ethyl and vinyl; $x_4$ and $y_4$ are independently integers selected from 1 and 2; $z_4$ is an integer selected from 0 and 1; and $x_4+y_4+z_4=3$; R' is independently selected from $C_1$-$C_{12}$ alkyl, $C_2$-$C_{12}$ alkenyl, $C_6$-$C_{18}$ aryl, $C_7$-$C_{18}$ alkylaryl, and tri($C_1$-$C_6$ alkyl, $C_6$-$C_{12}$ aryl or $C_7$-$C_{18}$ (alkylaryl)silyl, wherein the two R' groups may be connected to form a ring and the ring may contain, further to the Si-bonded nitrogen atom, one or more of an oxygen atom, a nitrogen atom, an >N($C_1$-$C_6$ alkyl) group and a sulfur atom; and one R' may be —Si $(CR_c=CR_aR_b)(OSi(R_d)_3)_{y4}(R")_{z4}$, wherein $R_a$, $R_b$, $R_c$, $R_d$, R", $y_4$ and $z_4$ are independently as defined above and $y_4+z_4=2$.

In preferred embodiments of the vinylsilane compound of formula (4), the parameters and substituents take the following values:

a) $(R_d)_3$ is (methyl, methyl, t-butyl) or (phenyl, phenyl, phenyl) or (t-butyl, phenyl, phenyl) or (hexyl, hexyl, hexyl); R' is independently selected from methyl, ethyl, n-propyl, n-butyl, pentyl, hexyl, heptyl, octyl and benzyl (bonded via methyl group), or —NR'R' forms a morpholine group, pyrrolidine group, piperidine group or oxazolidine group; R" is methyl; $R_a$, $R_b$ and $R_c$ are each hydrogen; and $x_4=y_4=z_4=1$;

b) $(R_d)_3$ is (methyl, methyl, t-butyl) or (hexyl, hexyl, hexyl); R' is independently selected from methyl and ethyl, or —NR'R' forms a morpholine group, pyrrolidine group, piperidine group or oxazolidine group; R" is methyl; $R_a$, $R_b$ and $R_c$ are each hydrogen; and $x_4=2$, $y_4=1$ and $z_4=0$;

c) $(R_d)_3$ is (methyl, methyl, t-butyl) or (hexyl, hexyl, hexyl); R' is independently selected from methyl and ethyl, or —NR'R' forms a morpholine group, pyrrolidine group, piperidine group or oxazolidine group; R" is methyl; $R_a$ and $R_b$ are each hydrogen and $R_c$ is vinyl; and $x_4=y_4=z_4=1$.

Preferred embodiments of the vinylsilane compound of formula (4) are (tert-butyldimethylsiloxy)methyl-4-morpholino(vinyl)silane, (tert-butyldimethylsiloxy)(dimethylamino)methyl(vinyl)silane, (tert-butyldimethylsiloxy)(diethylamino)methyl(vinyl)silane, and/or (tert-butyldimethylsiloxy)(dibutylamino)-methyl(vinyl)silane.

In another preferred embodiment, the vinylsilane compound of formula (4) is represented by formula (4a), as defined below.

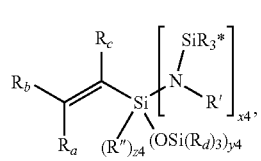

formula (4a)

wherein R* is independently selected from $C_1$-$C_6$ alkyl, $C_6$-$C_{12}$ aryl and $C_7$-$C_{18}$ alkylaryl, and the remaining groups and parameters are as defined for formula (4).

Preferred embodiments of the vinylsilane compound of formula (4a) are (tert-butyldimethylsiloxy)[(trimethylsilyl)-propylamino]methyl(vinyl)silane(tert-butyldimethylsiloxy)-[(trimethylsilyl)methylamino]methyl(vinyl)silane, (tert-butyldimethylsiloxy) [(trimethylsilyl)ethylamino]methyl (vinyl) silane, (tert-butyldimethylsiloxy)[(trimethylsilyl)-butylamino]methyl(vinyl)silane, (tert-butyldimethylsiloxy)-[(dimethylphenylsilyl)propylamino]methyl(vinyl)silane, (tert-butyldimethylsiloxy)[(dimethylphenylsilyl)ethyl-amino]methyl(vinyl)silane, and (tert-butyldimethylsiloxy) [(dimethyl-phenylsilyl)methylamino]methyl(vinyl)silane.

Vinylsilane compounds, as described above, are disclosed in more detail in Taiwan(R.O.C.) Patent Application No. 103128797 which is entirely incorporated by reference.

The multivinylaminosilane compound of formula (5) is defined as follows:

$(A^1)\text{-}B_{n1}$  formula (5), wherein $A^1$ is an organic group having at least two amino groups; each B is independently selected from a group $—Si(R^{51})(R^{52})(R^{53})$, wherein $R^{51}$, $R^{52}$ and $R^{53}$ are each independently selected from vinyl, butadienyl, methyl, ethyl, propyl, butyl and phenyl, provided that at least one of $R^{51}$, $R^{52}$ and $R^{53}$ is selected from vinyl and butadienyl, wherein each group B is a substituent of an amino group of group $A^1$, and at least two of the amino groups of group $A^1$ are each substituted with at least one group B; and $n_1$ is an integer of at least 2, preferably an integer selected from 2 to 6; and all amino groups in group $A^1$ are tertiary amino groups.

The multivinylaminosilane of formula (5) has at least two amino groups substituted with at least one ethylenically unsaturated silyl group B. The expression "group B is a substituent of an amino group" or "amino group substituted with a group B" is used herein to describe the bonding of the group B to the nitrogen atom of the amino group, i.e. $>\!N\text{-}Si(R^{51})(R^{52})(R^{53})$. An amino group of group $A^1$ may be substituted with 0, 1 or 2 groups B. All amino groups of group $A^1$ are tertiary amino groups, i.e. amino groups carrying no hydrogen atom. The organic group $A^1$ is preferably a group having no polymerization hydrogens. The expression "polymerization hydrogen" is used in the context of the present invention to designate a hydrogen atom which is not inert, i.e. will react, in an anionic polymerization of conjugated dienes, such as butadiene or isoprene. The organic group $A^1$ is also preferably a group having no electrophilic groups. The expression "electrophilic groups" is used in the context of the present invention to designate a group which will react with n-butyllithium as a model initiator and/or with the living chain in an anionic polymerization of conjugated dienes, such as butadiene or isoprene. Electrophilic groups include: alkynes, (carbo)cations, halogen atoms, Si—O, Si—S, Si-halogen groups, metal-C-groups, nitriles, (thio)-carboxylates, (thio)carboxylic esters, (thio)anhydrides, (thio)ketones, (thio)aldehydes, (thio)cyanates, (thio)-isocyanates, alcohols, thiols, (thio)sulfates, sulfonates, sulfamates, sulfones, sulfoxides, imines, thioketals, thioacetals, oximes, carbazones, carbodiimides, ureas, urethanes, diazonium salts, carbamates, amides, nitrones, nitro groups, nitrosamines, xanthogenates, phosphanes, phosphates, phosphines, phosphonates, boronic acids, boronic esters, etc.

More preferably, the organic group $A^1$ is a group having neither polymerization hydrogens nor electrophilic groups.

In preferred embodiments, the multivinylaminosilane of formula (5) is selected from the following compounds:

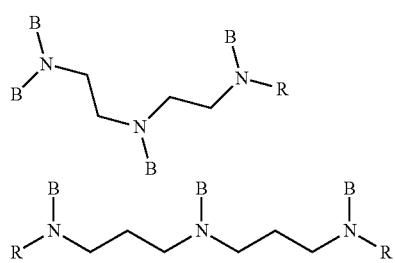

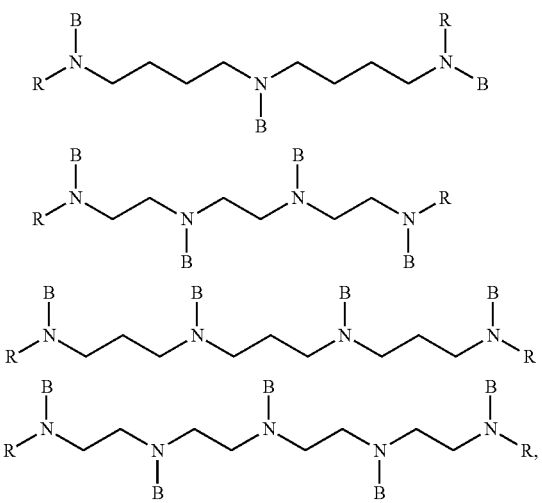

wherein each R is independently selected from B and $C_1$-$C_6$ alkyl, or benzyl, and the same limitations and provisos of formula (5) apply as regards the group B.

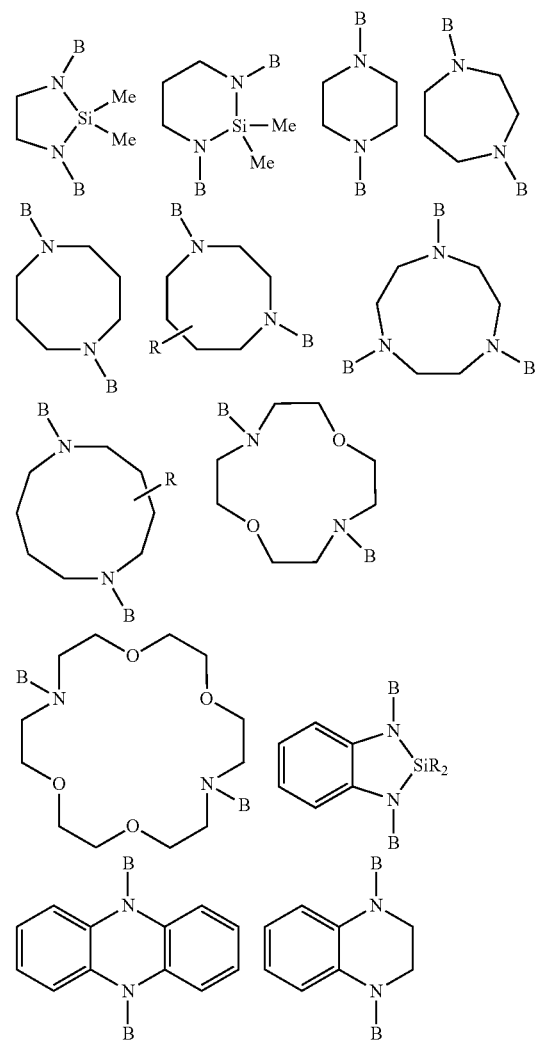

-continued
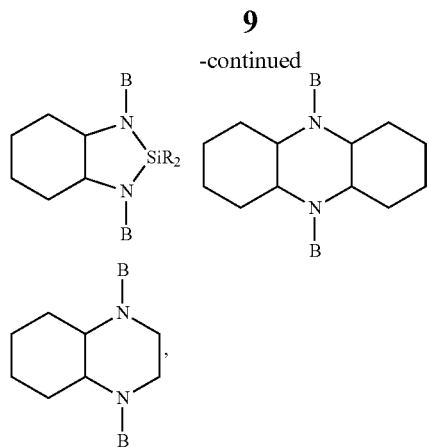
wherein R is a $C_1$-$C_6$ alkyl group, and the same limitations and provisos of formula (5) apply as regards the group B.
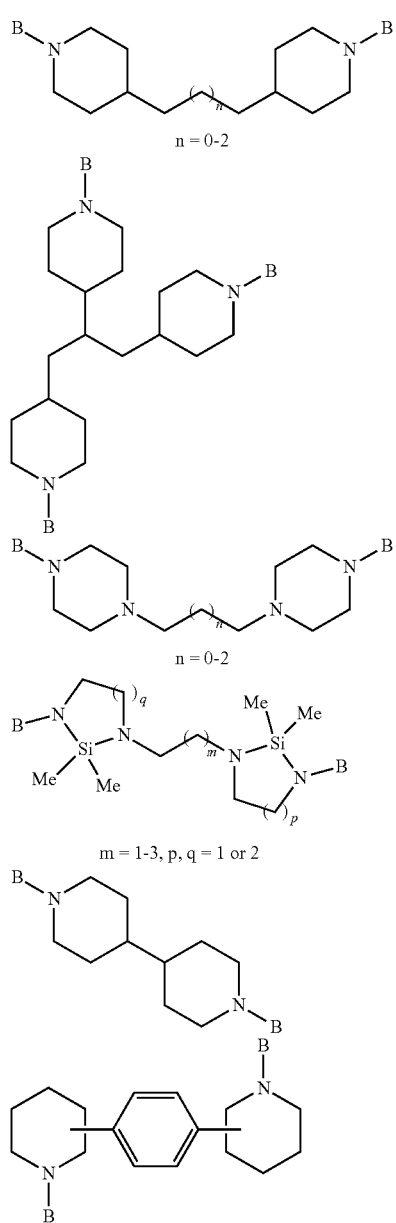
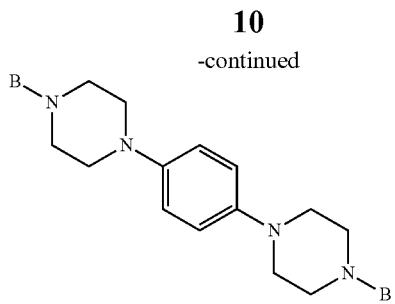
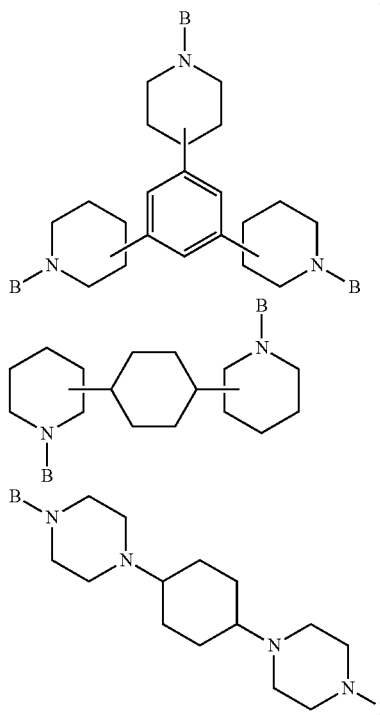
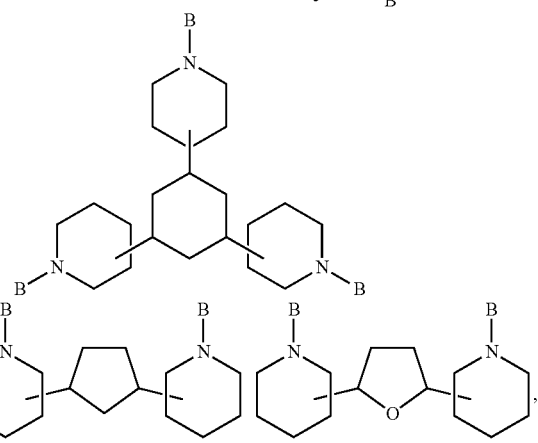
wherein the same limitations and provisos of formula (5) apply as regards the group B.
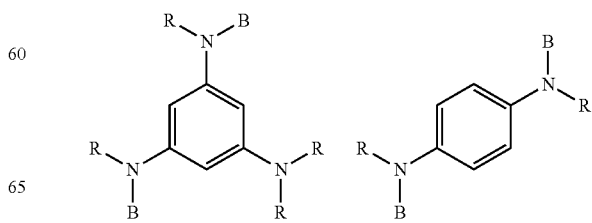

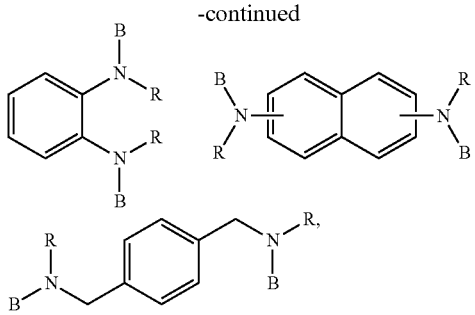

wherein each R is independently selected from B, $C_1$-$C_4$ alkyl and phenyl, and the same limitations and provisos of formula (5) apply as regards the group B.

Most preferably, styrene, α-methylstyrene, and/or divinylbenzene, including 1,2-divinylbenzene, 1,3-divinylbenzene and 1,4-divinylbenzene, are used as the at least one α-olefin monomer, as defined in claim 1.

Temperature

Typically, the polymerization of the monomers, i.e. at least one conjugated diene monomer and optionally one or more α-olefin monomer(s), as described above, is carried out at a temperature above 0° C. In a preferred embodiment, the temperature of the polymerization is in the range of 20° C.-110° C., more preferably in the range of 30° C.-95° C.

Solvent

An organic solvent may be suitably used for the polymerization reaction. In one embodiment, the polymerization solvent is selected from non-polar aromatic and non-aromatic solvents including, without limitation, butane, butene, pentane, cyclohexane, toluene, hexane, heptane and octane. In a preferred embodiment, the solvent is selected from butane, butene, cyclohexane, hexane, heptane, toluene or mixtures thereof.

Solid Content of Monomers

Preferably, the solid content of the monomers to be polymerized is from 5 to 35 percent by weight, more preferably from 10 to 30 percent by weight, and most preferably from 15 to 25 percent by weight, based on the total weight of monomers and solvent. The term "total solid content of monomers" (herein abbreviated as TSC), "solid content of monomers", or similar terms, as used herein, refer to the total mass (or weight) percentage of monomers, based on the total weight of solvent and monomers (e.g. 1,3-butadiene and styrene).

Polymerization Initiator

The polymerization initiator is suitably an alkyl lithium compound, such as ethyl lithium, propyl lithium, n-butyl lithium, sec-butyl lithium, tert-butyl lithium, phenyl lithium, hexyl lithium, 1,4-dilithio-n-butane, a compound represented by the following formula (6) to formula (10), or Lewis base adducts thereof. Mixtures of these polymerization initiators may also be employed.

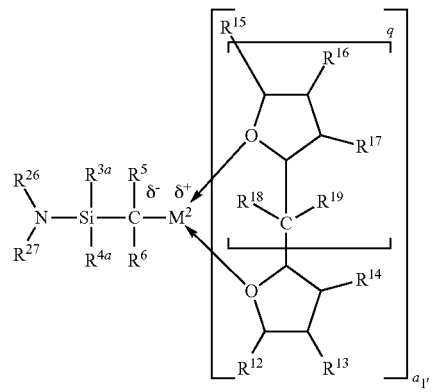

wherein $R^{3a}$ is independently selected from —N($R^{28}$)$R^{29}$, $C_1$-$C_{18}$ alkyl, $C_6$-$C_{18}$ aryl and ($C_7$-$C_{18}$) aralkyl; $R^{4a}$ is independently selected from —N($R^{30a}$)$R^{31a}$, ($C_1$-$C_{18}$) alkyl, ($C_6$-$C_{18}$) aryl and ($C_7$-$C_{18}$) aralkyl; $R^5$ and $R^6$ are each independently selected from hydrogen, $C_1$-$C_{18}$ alkyl, $C_6$-$C_{18}$ aryl and $C_7$-$C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently selected from hydrogen, $C_1$-$C_{18}$ alkyl, $C_6$-$C_{18}$ aryl and $C_7$-$C_{18}$ aralkyl; $R^{26}$, $R^{27}$, $R^{28}$, $R^{29}$, $R^{30a}$ and $R^{31a}$ are each independently selected from $C_1$-$C_{18}$ alkyl, $C_6$-$C_{18}$ aryl and $C_7$-$C_{18}$ aralkyl; q is selected from an integer of 1, 2, 3, 4 and 5; and r is selected from an integer of 1, 2 and 3; and $a_{1'}$ is selected from an integer of 0 or 1.

In a preferred embodiment, $R^{3a}$, $R^{4a}$, $R^{22}$, $R^{23}$, $R^{24}$, $R^{25}$, $R^{26}$ and $R^{27}$ are each independently selected from ($C_1$-$C_{18}$) alkyl; $R^5$, $R^6$, $R^{18}$, $R^{19}$, $R^{20}$ and $R^{21}$ are each independently selected from hydrogen and ($C_1$-$C_{18}$) alkyl; and $R^{12}$, $R^{13}$, $R^{14}$, $R^{15}$, $R^{16}$ and $R^{17}$ are each independently selected from hydrogen and ($C_1$-$C_6$) alkyl; and the remaining groups and parameters are defined as in formula (6) and formula (7) above.

Useful amino silane polymerization initiators of formula (6) and (7) include the following:

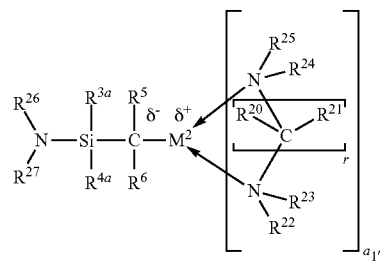

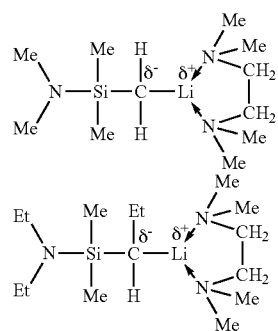

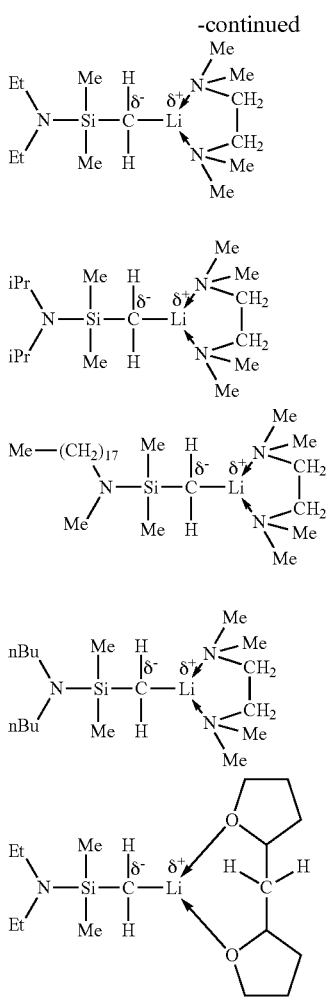

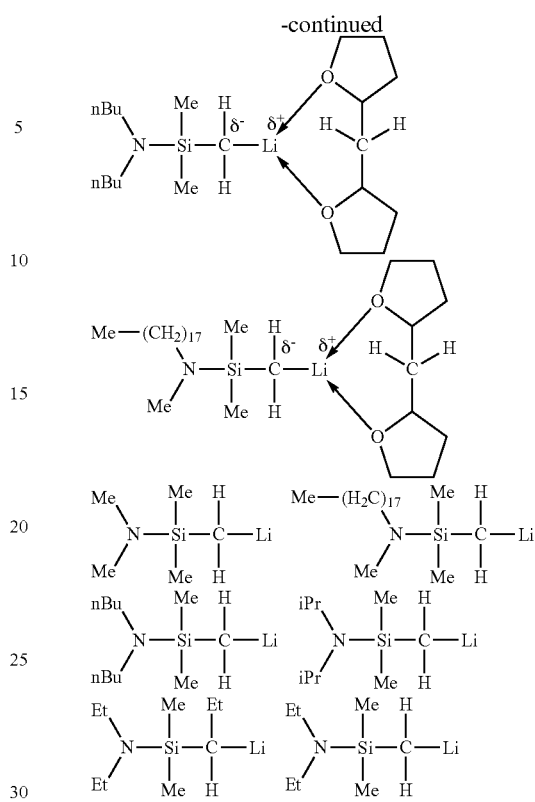

or Lewis base adducts thereof, and/or mixtures thereof. Amino silane polymerization initiators, as described above, are disclosed in more detail in WO 2014/040640 which is entirely incorporated by reference.

Alternatively, a compound represented by formula (8) may be used as polymerization initiator.

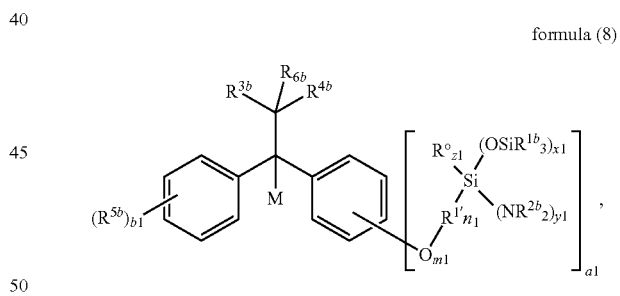

formula (8)

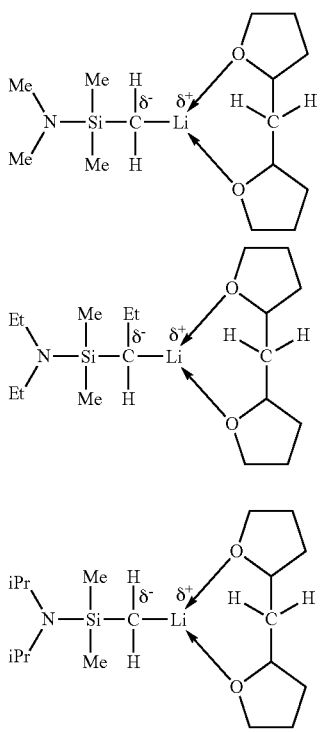

wherein each $R°$ is independently selected from $C_1$-$C_6$ alkyl, $C_2$-$C_6$ alkenyl, $C_7$-$C_{10}$ alkylaryl and $C_6$-$C_{10}$ aryl, preferably independently selected from $C_1$-$C_4$ alkyl, $C_7$ alkylaryl and $C_6$ aryl; $R^{1'}$ is an optionally substituted methylene group; each $R^{1b}$ is independently selected from $C_1$-$C_{10}$ alkyl, $C_7$-$C_{10}$ alkylaryl and $C_6$-$C_{10}$ aryl, preferably independently selected from $C_1$-$C_6$ alkyl and $C_6$-$C_{10}$ aryl; each $R^{2b}$ is independently selected from $C_1$-$C_{10}$ alkyl, $C_7$-$C_{10}$ alkylaryl and $C_6$-$C_{10}$ aryl, preferably independently selected from $C_1$-$C_8$ alkyl and $C_7$-$C_8$ alkylaryl, wherein the $R^{2b}$ groups may be connected to each other to form a ring together with the Si-bonded nitrogen atom; $R^{3b}$ and $R^{4b}$ are each independently selected from hydrogen, methyl, ethyl, propyl, butyl and vinyl; each $R^{5b}$ is independently selected from $C_1$-$C_5$ alkyl, $C_7$-$C_{12}$ alkylaryl and $C_6$-$C_{12}$ aryl, preferably independently selected from $C_1$-$C_5$ alkyl, $C_7$-alkylaryl and $C_6$-aryl, more preferably independently selected from $C_1$-$C_5$ alkyl; $R^{6b}$ is selected from $C_1$-$C_6$ alkyl, phenyl and benzyl; M is lithium; $a_1 \geq 1$; $b_1 \geq 0$; $a_1+b_1 \leq 10$; $m_1=0$ or 1; $n_1=0$ to 12; $x_1=0$, 1 or 2; $y_1=1$, 2 or 3; $z_1=0$, 1 or 2; $x_1+y_1+z_1=3$; or $x_1+y_1+z_1=2$ when the silicon atom of the aminosilyl group is bonded twice to the benzene rings via groups $R^{1'}$ or single bonds; provided that when $m_1=1$, then $n_1=1$ to 12, and when $m_1=0$, then $n_1=0$ and $x_1=1$ or 2; wherein the aminosilyl group(s) may be bonded to any of the two benzene rings, plural aminosilyl groups may be different from each other, and the $R^{5b}$ group(s) may be bonded to any of the two benzene rings.

In a preferred embodiment, each $R°$ is independently selected from $C_1$-$C_5$ alkyl and $C_6$ aryl; each $R^{1b}$ is independently selected from $C_1$-$C_4$ alkyl and $C_6$ aryl; each $R^{2b}$ is independently selected from $C_1$-$C_8$ alkyl and $C_7$-$C_{10}$ alkylaryl; $R^{3b}$ and $R^{4b}$ are each hydrogen; each $R^{5b}$ is independently selected from $C_1$-$C_4$ alkyl; $R^{6b}$ is selected from methyl, ethyl, tert-butyl, n-butyl, sec-butyl, phenyl and benzyl; $a_1=1$ or 2, $b_1=0$ or 1, $m_1=0$ and $R^{1'}$ is methylene and $n_1=1$, 2 or 3, $x_1=0$ or 1, $y_1=1$ or 2 and $z_1=0$ or 1; and the remaining groups and parameters are defined as in formula (8) above.

The preparation of the polymerization initiators of formula (8), as described above, is disclosed in more detail in PCT/EP2014/065027 which is entirely incorporated by reference.

Alternatively, a compound of formula (9) may be used as polymerization initiator.

$-SiR^{20c}R^{21c}R^{22c}$, wherein $R^{20c}$, $R^{21c}$ and $R^{22c}$ are each independently selected from $(C_1$-$C_{18})$ alkyl, $(C_6$-$C_{18})$ aryl and $(C_7$-$C_{18})$ alkylaryl; $t_3$ and $u_3$ are each an integer selected from 0 and 1; and $t_3+u_3=1$ when $Y^{3c}=N$, $t_3=u_3=0$ when $Y^{3c}=S$, and $t_3+u_3=2$ when $Y^{3c}=Si$; $s_3$ is an integer selected from 0, 1 and 2; each $F^3$ is independently selected from $(C_1$-$C_{18})$ alkyl, $(C_6$-$C_{18})$ aryl, $(C_7$-$C_{18})$ alkylaryl, and $-Y^{2c}(R^{6c})(R^{7c})_{q3}(R^{8c})_{r3}$, wherein $Y^{2c}$ is selected from a nitrogen atom, a sulfur atom and a silicon atom; $R^{6c}$, $R^{7c}$ and $R^{8c}$ are each independently selected from $(C_1$-$C_{18})$ alkyl, di$(C_1$-$C_6)$ alkyl amine (only when $Y^{2c}$ is a silicon atom), $(C_6$-$C_{18})$ aryl, $(C_7$-$C_{18})$ alkylaryl and, when $Y^{2c}$ is not a silicon atom, $-SiR^{17c}R^{18c}R^{19c}$, wherein $R^{17c}$, $R^{18c}$ and $R^{19c}$ are each independently selected from $(C_1$-$C_{18})$ alkyl, $(C_6$-$C_{18})$ aryl and $(C_7$-$C_{18})$ alkylaryl; $q_3$ and $r_3$ are each an integer selected from 0 and 1; and $q_3+r_3=1$ when $Y^{2C}=N$, $q_3=q_3=r_3=0$ when $Y^{2c}=S$, and $q_3+r_3=2$ when $Y^{2c}=Si$; and $p_3$ is an integer selected from 0, 1, 2 and 3.

In a preferred embodiment, each $R^{1c}$ is the same selected from $(C_1$-$C_{10})$ alkyl; each $R^{12c}$ is independently selected from hydrogen and $(C_1$-$C_{10})$ alkyl, preferably hydrogen; $R^{3c}$, $R^{4c}$ and $R^{5c}$ are each independently selected from $(C_1$-$C_{18})$ alkyl and, when $Y^{1c}$ is not a silicon atom, $-SiR^{14c}R^{15c}R^{16c}$, wherein $R^{14c}$, $R^{15c}$ and $R^{16c}$ are each independently selected from $(C_1$-$C_{18})$ alkyl; each $E_3$ is independently selected from $(C_1$-$C_{18})$ alkyl; each $F_3$ is independently selected from $-Y^{2c}(R^{6c})(R^{7c})_{q3}(R^{8c})_{r3}$, wherein $R^{6c}$, $R^{7c}$ and $R^{8c}$ are each independently selected formula (9)

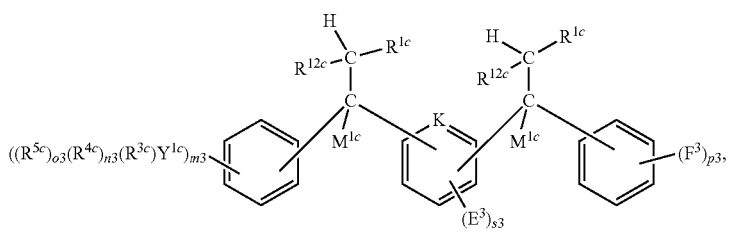

wherein each $M^{1c}$ is lithium; each $R^{1c}$ is independently selected from $C_1$-$C_{100}$ alkyl and $C_2$-$C_{100}$ alkenyl, optionally substituted with one or more $C_6$-$C_{12}$ aryl groups and optionally linked to the carbon atom C by up to 25 monomer units selected from conjugated diene monomers and aromatic vinyl compounds, especially butadiene, isoprene and styrene; each $R^{12c}$ is independently selected from hydrogen, $(C_1$-$C_{10})$ alkyl, $(C_6$-$C_{12})$ aryl and $(C_7$-$C_{18})$ alkylaryl; each $Y^{1c}$ is independently selected from a nitrogen atom, a sulfur atom and a silicon atom; $R^{3c}$, $R^{4c}$ and $R^{5c}$ are each independently selected from $(C_1$-$C_{18})$ alkyl, di$(C_1$-$C_6)$ alkyl amine (only when $Y^{1c}$ is a silicon atom), $(C_6$-$C_{18})$ aryl, $(C_7$-$C_{18})$ alkylaryl and, when $Y^{1c}$ is not a silicon atom, $-SiR^{14c}R^{15c}R^{16c}$, wherein $R^{14c}$, $R^{15c}$ and $R^{16c}$ are each independently selected from $(C_1$-$C_{18})$ alkyl, $(C_6$-$C_{18})$ aryl and $(C_7$-$C_{18})$ alkylaryl; $n_3$ and $o_3$ are each an integer selected from 0 and 1; and $n_3+o_3=0$ when $Y^{1c}=N$, $n_3=o_3=0$ when $Y^{1c}=S$, and $n_3+o_3=2$ when $Y^{1c}=Si$; $m_3$ is an integer selected from 0, 1, 2 and 3; K is selected from nitrogen and >C—H; each $E^3$ is independently selected from $(C_1$-$C_{18})$ alkyl, $(C_6$-$C_{18})$ aryl, $(C_7$-$C_{18})$ alkylaryl, and $-Y^{3c}(R^{9c})(R^{10c})_{t3}(R^{11c})_{u3}$, wherein $Y^{3c}$ is selected from a nitrogen atom, a sulfur atom and a silicon atom; $R^{9c}$, $R^{10c}$ and $R^{11c}$ are each independently selected from $(C_1$-$C_{18})$ alkyl, di$(C_1$-$C_6)$ alkyl amine (only when $Y^{3c}$ is a silicon atom), $(C_6$-$C_{18})$ aryl, $(C_7$-$C_{18})$ alkylaryl, and, when $Y^{3c}$ is not a silicon atom, from $(C_1$-$C_{18})$ alkyl and, when $Y^{2c}$ is not a silicon atom, $-SiR^{17c}R^{18c}R^{19c}$, wherein $R^{17c}$, $R^{18c}$ and $R^{19c}$ are each independently selected from $(C_1$-$C_{18})$ alkyl; $p_3$ is an integer selected from 1, 2 and 3; and the remaining groups and parameters are as defined above for formula (9).

Polymerization initiators of formula (9) and their preparations are disclosed in PCT/EP2013/065399, which is entirely incorporated by reference.

Alternatively, a polymerization initiator of formula (10) may be used.

formula (10)

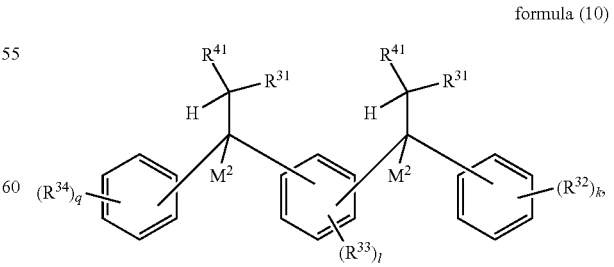

wherein each $R^{31}$ is independently selected from hydrogen, $(C_1$-$C_{10})$ alkyl, $(C_6$-$C_{12})$ aryl and $(C_7$-$C_{18})$ aralkyl; each $R^{32}$, $R^{33}$ and $R^{34}$ is independently selected from hydrogen, ($C_1$-$C_{18}$) alkyl and ($C_1$-$C_{18}$) alkoxy; each $R^{41}$ is independently selected from ($C_1$-$C_{100}$) alkyl and ($C_2$-$C_{100}$) alkenyl, wherein each $R^{41}$ is optionally substituted with one to three ($C_6$-$C_{12}$) aryl groups and is optionally bonded to the skeleton of formula (10) via an oligomer chain composed of up to 25 monomer units selected from conjugated dienes, especially 1,3-butadiene and isoprene, and aromatic vinyl compounds, especially styrene and divinylbenzene; $M^2$ is lithium; and k, l and q are integers independently selected from 0, 1, 2 and 3.

In a preferred embodiment, $R^{41}$ is selected from ($C_1$-$C_{10}$) alkyl; each $R^{31}$ is independently selected from hydrogen and ($C_1$-$C_{10}$) alkyl, preferably hydrogen; $R^{32}$ and $R^{34}$ are identical and are selected from hydrogen and ($C_1$-$C_{18}$) alkyl; and each $R^{33}$ is independently selected from hydrogen and ($C_1$-$C_{18}$) alkyl.

The polymerization initiators of formula (10), as described above, are disclosed in more detail in EP Application No. 15 151 112.8 which is entirely incorporated by reference.

Most preferably, n-butyl lithium, sec-butyl lithium, or a compound of formula (6) or formula (7), in particular

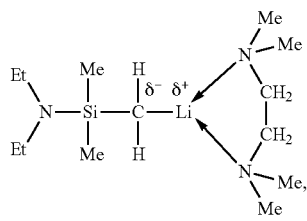

is used. The above initiators may be used alone or in combination as a mixture of two or more different types.

Modification

In the third and fourth embodiments for component (a), as described above, an additional (II) modification (or functionalization) reaction step with at least one compound of formula (1) to (3) and/or formula (11) to (15), as defined below, is performed.

wherein each of R is independently selected from $C_1$-$C_{16}$ alkyl or alkylaryl; R* is independently selected from $C_1$-$C_4$ alkyl; A is selected from $C_6$-$C_{18}$ aryl, $C_7$-$C_{50}$ alkylaryl, $C_1$-$C_{50}$ alkyl and $C_2$-$C_{50}$ dialkylether; and optionally R, R*, or A may independently be substituted with one or more groups, selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl) amino, bis(tri($C_1$-$C_{12}$ alkyl)silyl)amino, tris($C_1$-$C_7$ hydrocarbyl)silyl and $C_1$-$C_{12}$ thioalkyl; x is an integer selected from 1, 2 and 3; y is an integer selected from 0, 1 and 2; provided that x+y=3, More preferably, each of R* are independently selected from methyl, ethyl, iso-propyl, n-propyl, n-butyl, iso-butyl, or tert.-butyl; each of R are independently selected from $C_1$-$C_6$ alkyl, $C_6$-$C_{12}$ aryl, or $C_7$-$C_{10}$ aralkyl; and A is —($CH_2$)N— wherein N is an integer selected from 1, 2, 3, 4, 5 or 6.

Preferred examples of compounds represented by formula (1) as modification agent(s) include, without limitation, (MeO)$_3$Si—(CH$_2$)$_3$—S—SiMe$_3$, (EtO)$_3$Si—(CH$_2$)$_3$—S—SiMe$_3$, (PrO)$_3$Si—(CH$_2$)$_3$—S—SiMe$_3$, (BuO)$_3$Si—(CH$_2$)$_3$—S—SiMe$_3$, (MeO)$_3$Si—(CH$_2$)$_2$—S—SiMe$_3$, (EtO)$_3$Si—(CH$_2$)$_2$—S—SiMe$_3$, (PrO)$_3$Si—(CH$_2$)$_2$—S—SiMe$_3$, (BuO)$_3$Si—(CH$_2$)$_2$—S—SiMe$_3$, (MeO)$_3$Si—CH$_2$—S—SiMe$_3$, (EtO)$_3$Si—CH$_2$—S—SiMe$_3$, (PrO)$_3$Si—CH$_2$—S—SiMe$_3$, (BuO)$_3$Si—CH$_2$—S—SiMe$_3$, (MeO)$_3$Si—CH$_2$—CMe$_2$-CH$_2$—S—SiMe$_3$, (EtO)$_3$Si—CH$_2$—CMe$_2$-CH$_2$—S—SiMe$_3$, (PrO)$_3$Si—CH$_2$—CMe$_2$-CH$_2$—S—SiMe$_3$, (BuO)$_3$Si—CH$_2$—CMe$_2$-CH$_2$—S—SiMe$_3$, (MeO)$_3$Si—CH$_2$—C(H)Me-CH$_2$—S—SiMe$_3$, (EtO)$_3$Si—CH$_2$—C(H)Me-CH$_2$—S—SiMe$_3$, (PrO)$_3$Si—CH$_2$—C(H)Me-CH$_2$—S—SiMe$_3$, (BuO)$_3$Si—CH$_2$—C(H)Me-CH$_2$—S—SiMe$_3$, (MeO)$_3$Si—(CH$_2$)$_3$—S—SiEt$_3$, (EtO)$_3$Si—(CH$_2$)$_3$—S—SiEt$_3$, (PrO)$_3$Si—(CH$_2$)$_3$—S—SiEt$_3$, (BuO)$_3$Si—(CH$_2$)$_3$—S—SiEt$_3$, (MeO)$_3$Si—(CH$_2$)$_2$—S—SiEt$_3$, (EtO)$_3$Si—(CH$_2$)$_2$—S—SiEt$_3$, (PrO)$_3$Si—(CH$_2$)$_2$—S—SiEt$_3$, (BuO)$_3$Si—(CH$_2$)$_2$—S—SiEt$_3$, (MeO)$_3$Si—CH$_2$—S—SiEt$_3$, (EtO)$_3$Si—CH$_2$—S—SiEt$_3$, (PrO)$_3$Si—CH$_2$—S—SiEt$_3$, (BuO)$_3$Si—CH$_2$—S—SiEt$_3$, (MeO)$_3$Si—CH$_2$—CMe$_2$-CH$_2$—S—SiEt$_3$, (EtO)$_3$Si—CH$_2$—CMe$_2$-CH$_2$—S—SiEt$_3$, (PrO)$_3$Si—CH$_2$—CMe$_2$-CH$_2$—S—SiEt$_3$, (BuO)$_3$Si—CH$_2$—CMe$_2$-CH$_2$—S—SiEt$_3$, (MeO)$_3$Si—CH$_2$—C(H)Me-CH$_2$—S—SiEt$_3$, (EtO)$_3$Si—CH$_2$—C(H)Me-CH$_2$—S—SiEt$_3$, (PrO)$_3$Si—CH$_2$—C(H)Me-CH$_2$—S—SiEt$_3$, (BuO)$_3$Si—CH$_2$—C(H)Me-CH$_2$—S—SiEt$_3$, (MeO)$_3$Si—(CH$_2$)$_3$—S—SiMe$_2$tBu, (EtO)$_3$Si—(CH$_2$)$_3$—S—SiMe$_2$tBu, (PrO)$_3$Si—(CH$_2$)$_3$—S—SiMe$_2$tBu, (BuO)$_3$Si—(CH$_2$)$_3$—S—SiMe$_2$tBu, (MeO)$_3$Si—(CH$_2$)$_2$—S—SiMe$_2$tBu, (EtO)$_3$Si—(CH$_2$)$_2$—S—SiMe$_2$tBu, (PrO)$_3$Si—(CH$_2$)$_2$—S—SiMe$_2$tBu, (BuO)$_3$Si—(CH$_2$)$_2$—S—SiMe$_2$tBu, (MeO)$_3$Si—CH$_2$—S—SiMe$_2$tBu, (EtO)$_3$Si—CH$_2$—S—SiMe$_2$tBu, (PrO)$_3$Si—CH$_2$—S—SiMe$_2$tBu, (BuO)$_3$Si—CH$_2$—S—SiMe$_2$tBu, (MeO)$_3$Si—CH$_2$—CMe$_2$-CH$_2$—S—SiMe$_2$tBu, (EtO)$_3$Si—CH$_2$—CMe$_2$-CH$_2$—S—SiMe$_2$tBu, (PrO)$_3$Si—CH$_2$—CMe$_2$-CH$_2$—S—SiMe$_2$tBu, (BuO)$_3$Si—CH$_2$—CMe$_2$-CH$_2$—S—SiMe$_2$tBu, (MeO)$_3$Si—CH$_2$—C(H)Me-CH$_2$—S—SiMe$_2$tBu, (EtO)$_3$Si—CH$_2$—C(H)Me-CH$_2$—S—SiMe$_2$tBu, (PrO)$_3$Si—CH$_2$—C(H)Me-CH$_2$—S—SiMe$_2$tBu, (BuO)$_3$Si—CH$_2$—C(H)Me-CH$_2$—S—SiMe$_2$tBu, (MeO)$_2$MeSi—(CH$_2$)$_3$—S—SiMe$_3$, (EtO)$_2$MeSi—(CH$_2$)$_3$—S—SiMe$_3$, (PrO)$_2$MeSi—(CH$_2$)$_3$—S—SiMe$_3$, (BuO)$_2$MeSi—(CH$_2$)$_3$—S—SiMe$_3$, (MeO)$_2$MeSi—(CH$_2$)$_2$—S—SiMe$_3$, (EtO)$_2$MeSi—(CH$_2$)$_2$—S—SiMe$_3$, (PrO)$_2$MeSi—(CH$_2$)$_2$—S—SiMe$_3$, (BuO)$_2$MeSi—(CH$_2$)$_2$—S—SiMe$_3$, (MeO)$_2$MeSi—CH$_2$—S—SiMe$_3$, (EtO)$_2$MeSi—CH$_2$—S—SiMe$_3$, (PrO)$_2$MeSi—CH$_2$—S—SiMe$_3$, (BuO)$_2$MeSi—CH$_2$—S—SiMe$_3$, (MeO)$_2$MeSi—CH$_2$—CMe$_2$-CH$_2$—S—SiMe$_3$, (EtO)$_2$MeSi—CH$_2$—CMe$_2$-CH$_2$—S—SiMe$_3$, (PrO)$_2$MeSi—CH$_2$—CMe$_2$-CH$_2$—S—SiMe$_3$, (BuO)$_2$MeSi—CH$_2$—CMe$_2$-CH$_2$—S—SiMe$_3$, (MeO)$_2$MeSi—CH$_2$—C(H)Me-CH$_2$—S—SiMe$_3$, (EtO)$_2$MeSi—CH$_2$—C(H)Me-CH$_2$—S—SiMe$_3$, (PrO)$_2$MeSi—CH$_2$—C(H)Me-CH$_2$—S—SiMe$_3$, (BuO)$_2$MeSi—CH$_2$—C(H)Me-CH$_2$—S—SiMe$_3$, (MeO)$_2$MeSi—(CH$_2$)$_3$—S—SiEt$_3$, (EtO)$_2$MeSi—(CH$_2$)$_3$—S—SiEt$_3$, (PrO)$_2$MeSi—(CH$_2$)$_3$—S—SiEt$_3$, (BuO)$_2$MeSi—(CH$_2$)$_3$—S—SiEt$_3$, (MeO)$_2$MeSi—(CH$_2$)$_2$—S—SiEt$_3$, (EtO)$_2$MeSi—(CH$_2$)$_2$—S—SiEt$_3$, (PrO)$_2$MeSi—(CH$_2$)$_2$—S—SiEt$_3$, (BuO)$_2$MeSi—(CH$_2$)$_2$—S—SiEt$_3$, (MeO)$_2$MeSi—CH$_2$—S—SiEt$_3$, (EtO)$_2$MeSi—CH$_2$—S—SiEt$_3$, (PrO)$_2$MeSi—CH$_2$—S—SiEt$_3$, (BuO)$_2$MeSi—CH$_2$—S—SiEt$_3$, (MeO)$_2$MeSi—CH$_2$—CMe$_2$-CH$_2$—S—SiEt$_3$, (EtO)$_2$MeSi—CH$_2$—CMe$_2$-CH$_2$—S—SiEt$_3$, (PrO)$_2$MeSi—CH$_2$—CMe$_2$-CH$_2$—S—SiEt$_3$, (BuO)$_2$MeSi—CH$_2$—CMe$_2$-CH$_2$—S—SiEt$_3$, (MeO)$_2$MeSi—CH$_2$—C(H)Me-CH$_2$—S—SiEt$_3$, (EtO)$_2$MeSi—CH$_2$—C(H)Me-CH$_2$—S—SiEt$_3$, (PrO)$_2$MeSi—CH$_2$—C(H)Me-CH$_2$—S—SiEt$_3$, (BuO)$_2$MeSi—CH$_2$—C(H)Me-CH$_2$—S—SiEt$_3$, (MeO)$_2$MeSi—(CH$_2$)$_3$—S—SiMe$_2$tBu, (EtO)$_2$MeSi—(CH$_2$)$_3$—S—SiMe$_2$tBu, (PrO)$_2$MeSi—(CH$_2$)$_3$—S—SiMe$_2$tBu, (BuO)$_2$MeSi—(CH$_2$)$_3$—S—SiMe$_2$tBu, (MeO)$_2$MeSi—(CH$_2$)$_2$—S—SiMe$_2$tBu, (EtO)₂MeSi—(CH₂)₂—S—SiMe₂tBu, (PrO)₂MeSi—(CH₂)₂—S—SiMe₂tBu, (BuO)₂MeSi—(CH₂)₂—S—SiMe₂tBu, (MeO)₂MeSi—CH₂—S—SiMe₂tBu, (EtO)₂MeSi—CH₂—S—SiMe₂tBu, (PrO)₂MeSi—CH₂—S—SiMe₂tBu, (BuO)₂MeSi—CH₂—S—SiMe₂tBu, (MeO)₂MeSi—CH₂—CMe₂-CH₂—S—SiMe₂tBu, (EtO)₂MeSi—CH₂—CMe₂-CH₂—S—SiMe₂tBu, (PrO)₂MeSi—CH₂—CMe₂-CH₂—S—SiMe₂tBu, (BuO)₂MeSi—CH₂—CMe₂-CH₂—S—SiMe₂tBu, (MeO)₂MeSi—CH₂—C(H)Me-CH₂S—SiMe₂tBu, (EtO)₂MeSi—CH₂—C(H)Me-CH₂—S—SiMe₂tBu, (PrO)₂MeSi—CH₂—C(H)Me-CH₂—S—SiMe₂tBu, (BuO)₂MeSi—CH₂—C(H)Me-CH₂—S—SiMe₂tBu, (MeO)Me₂Si—(CH₂)₃—S—SiMe₃, (EtO)Me₂Si—(CH₂)₃—S—SiMe₃, (PrO)Me₂Si—(CH₂)₃—S—SiMe₃, (BuO)Me₂Si—(CH₂)₃—S—SiMe₃, (MeO)Me₂Si—(CH₂)₂—S—SiMe₃, (EtO)Me₂Si—(CH₂)₂—S—SiMe₃, (PrO)Me₂Si—(CH₂)₂—S—SiMe₃, (BuO)Me₂Si—(CH₂)₂—S—SiMe₃, (MeO)Me₂Si—CH₂—S—SiMe₃, (EtO)Me₂Si—CH₂—S—SiMe₃, (PrO)Me₂Si—CH₂—S—SiMe₃, (BuO)Me₂Si—CH₂—S—SiMe₃, (MeO)Me₂Si—CH₂—CMe₂-CH₂—S—SiMe₃, (EtO)Me₂Si—CH₂—CMe₂-CH₂—S—SiMe₃, (PrO)Me₂Si—CH₂—CMe₂-CH₂—S—SiMe₃, (BuO)Me₂Si—CH₂—CMe₂-CH₂—S—SiMe₃, (MeO)Me₂Si—CH₂—C(H)Me-CH₂—S—SiMe₃, (EtO)Me₂Si—CH₂—C(H)Me-CH₂—S—SiMe₃, (PrO)Me₂Si—CH₂—C(H)Me-CH₂—S—SiMe₃, (BuO) Me₂Si—CH₂—C(H)Me-CH₂—S—SiMe₃, (MeO)Me₂Si—(CH₂)₃—S—SiEt₃, (EtO)Me₂Si—(CH₂)₃—S—SiEt₃, (PrO)Me₂Si—(CH₂)₃—S—SiEt₃, (BuO)Me₂Si—(CH₂)₃—S—SiEt₃, (MeO)Me₂Si—(CH₂)₂—S—SiEt₃, (EtO)Me₂Si—(CH₂)₂—S—SiEt₃, (PrO)Me₂Si—(CH₂)₂—S—SiEt₃, (BuO)Me₂Si—(CH₂)₂—S—SiEt₃, (MeO)Me₂Si—CH₂—S—SiEt₃, (EtO)Me₂Si—CH₂—S—SiEt₃, (PrO)Me₂Si—CH₂—S—SiEt₃, (BuO)Me₂Si—CH₂—S—SiEt₃, (MeO)Me₂Si—CH₂—CMe₂-CH₂—S—SiEt₃, (EtO)Me₂Si—CH₂—CMe₂-CH₂—S—SiEt₃, (PrO)Me₂Si—CH₂—CMe₂-CH₂—S—SiEt₃, (BuO)Me₂Si—CH₂—CMe₂-CH₂—S—SiEt₃, (MeO)Me₂Si—CH₂—C(H)Me-CH₂—S—SiEt₃, (EtO)Me₂Si—CH₂—C(H)Me-CH₂—S—SiEt₃, (PrO)Me₂Si—CH₂—C(H)Me-CH₂—S—SiEt₃, (BuO)Me₂Si—CH₂—C(H)Me-CH₂—S—SiEt₃, (MeO)Me₂Si—(CH₂)₃—S—SiMe₂tBu, (EtO)Me₂Si—(CH₂)₃—S—SiMe₂tBu, (PrO)Me₂Si—(CH₂)₃—S—SiMe₂tBu, (BuO)Me₂Si—(CH₂)₃—S—SiMe₂tBu, (MeO)Me₂Si—(CH₂)₂—S—SiMe₂tBu, (EtO)Me₂Si—(CH₂)₂—S—SiMe₂tBu, (PrO)Me₂Si—(CH₂)₂—S—SiMe₂tBu, (BuO)Me₂Si—(CH₂)₂—S—SiMe₂tBu, (MeO)Me₂Si—CH₂—S—SiMe₂tBu, (EtO)Me₂Si—CH₂—S—SiMe₂tBu, (PrO)Me₂Si—CH₂—S—SiMe₂tBu, (BuO)Me₂Si—CH₂—S—SiMe₂tBu, (MeO)Me₂Si—CH₂—CMe₂-CH₂—S—SiMe₂tBu, (EtO)Me₂Si—CH₂—CMe₂-CH₂—S—SiMe₂tBu, (PrO)Me₂Si—CH₂—CMe₂-CH₂—S—SiMe₂tBu, (BuO) Me₂Si—CH₂—CMe₂-CH₂—S—SiMe₂tBu, (MeO)Me₂Si—CH₂—C(H)Me-CH₂—S—SiMe₂tBu, (EtO)Me₂Si—CH₂—C(H)Me-CH₂—S—SiMe₂tBu, (PrO)Me₂Si—CH₂—C(H)Me-CH₂—S—SiMe₂tBu, (BuO)Me₂Si—CH₂—C(H)Me-CH₂—S—SiMe₂tBu.

Most preferably, the sulfanylsilane compound of formula (1) is selected from (MeO)₃Si—(CH₂)₃—S—SiMe₂tBu, (MeO)₂(CH₃)Si—(CH₂)₃—S—SiMe₂tBu, (MeO) (Me)₂Si—(CH₂)₃—S—SiMe₂tBu and mixtures thereof.

Alternatively, a compound of formula (2) may be used.

$$((R^1O)_{x_2'}(R^2)_{y_2'}Si-R^3-S)_{s_2'}M^*(R^4)_{t_2'}(X^*)_{u_2'} \quad \text{formula (2),}$$

wherein M* is silicon or tin; $x_2'$ is an integer selected from 1, 2 and 3; $y_2'$ is an integer selected from 0, 1, and 2; wherein $x_2'+y_2'=3$; $s_2'$ is an integer selected from 2, 3 and 4; $t_2'$ is an integer selected from 0, 1 and 2; $u_2'$ is an integer selected from 0, 1 and 2; wherein $s_2'+t_2'+u_2'=4$; $R^1$ is independently selected from hydrogen and ($C_1$-$C_6$) alkyl; $R^2$ is independently selected from ($C_1$-$C_{16}$) alkyl, ($C_7$-$C_{16}$) alkylaryl and ($C_7$-$C_{16}$) arylalkyl; $R^3$ is at least divalent and is independently selected from ($C_1$-$C_{16}$) alkyl, ($C_8$-$C_{16}$) alkylarylalkyl, ($C_7$-$C_{16}$) arylalkyl and ($C_7$-$C_{16}$) alkylaryl, and each group may be substituted with one or more of the following groups: tertiary amine group, silyl group, ($C_7$-$C_{18}$) aralkyl group and ($C_6$-$C_{18}$) aryl group; $R^4$ is independently selected from ($C_1$-$C_{16}$) alkyl and ($C_7$-$C_{16}$) alkylaryl; X* is independently selected from chloride, bromide and —OR⁵*; wherein R⁵* is selected from ($C_1$-$C_{16}$) alkyl and ($C_7$-$C_{16}$) arylalkyl.

In a preferred embodiment, M* is a silicon atom; $R^3$ is divalent and is ($C_1$-$C_{16}$) alkyl; X* is —OR⁵*, wherein R⁵* is selected from ($C_1$-$C_4$) alkyl; $R^1$, $R^2$, and $R^4$ are independently selected from ($C_1$-$C_4$) alkyl; $s_2$, and $t_2'$ are each 2 and $u_2'$ is 0; and $x_2'$ is 2 and $y^{2'}$ is 1; and the remaining groups and parameters are as defined for formula (2).

Specific preferred species of the silane sulfide modification agent of the present invention include the following compounds and their corresponding Lewis base adducts:
(MeO)₃Si—(CH₂)₃—S—Si(Me)₂-S—(CH₂)₃—Si(OMe)₃, (MeO)₃Si—(CH₂)₃—S—Si (Et)₂-S—(CH₂)₃—Si(OMe)₃, (MeO)₃Si—(CH₂)₃—S—Si(Bu)₂-S—(CH₂)₃—Si(OMe)₃, (EtO)₃Si—(CH₂)₃—S—Si (Me)₂-S—(CH₂)₃—Si(OEt)₃, (EtO)₃Si—(CH₂)₃—S—Si (Et)₂-S—(CH₂)₃—Si(OEt)₃, (EtO)₃Si—(CH₂)₃—S—Si(Bu)₂-S—(CH₂)₃—Si(OEt)₃, (PrO)₃Si—(CH₂)₃—S—Si (Me)₂-S—(CH₂)₃—Si(OPr)₃, (PrO)₃Si—(CH₂)₃—S—Si (Et)₂-S—(CH₂)₃—Si(OPr)₃, (PrO)₃Si—(CH₂)₃—S—Si(Bu)₂-S—(CH₂)₃—Si(OPr)₃, (MeO)₃Si—(CH₂)₂—S—Si (Me)₂-S—(CH₂)₂—Si(OMe)₃, (MeO)₃Si—(CH₂)₂—S—Si(Et)₂-S—(CH₂)₂—Si(OMe)₃, (MeO)₃Si—(CH₂)₂—S—Si(Bu)₂-S—(CH₂)₂—Si(OMe)₃, (EtO)₃Si—(CH₂)₂—S—Si (Me)₂-S—(CH₂)₂—Si(OEt)₃, (EtO)₃Si—(CH₂)₂—S—Si (Et)₂-S—(CH₂)₂—Si(OEt)₃, (EtO)₃Si—(CH₂)₂—S—Si(Bu)₂-S—(CH₂)₂—Si(OEt)₃, (PrO)₃Si—(CH₂)₂—S—Si (Me)₂-S—(CH₂)₂—Si(OPr)₃, (PrO)₃Si—(CH₂)₂—S—Si (Et)₂-S—(CH₂)₂—Si(OPr)₃, (PrO)₃Si—(CH₂)₂—S—Si(Bu)₂-S—(CH₂)₂—Si(OPr)₃, (MeO)₃Si—CH₂—S—Si(Me)₂-S—CH₂—Si(OMe)₃, (MeO)₃Si—CH₂—S—Si (Et)₂-S—CH₂—Si(OMe)₃, (MeO)₃Si—CH₂—S—Si(Bu)₂-S—CH₂—Si(OMe)₃, (EtO)₃Si—CH₂—S—Si(Me)₂-S—CH₂—Si(OMe)₃, (EtO)₃Si—CH₂—S—Si(Et)₂-S—CH₂—Si(OEt)₃, (EtO)₃Si—CH₂—S—Si(Bu)₂-S—CH₂—Si(OEt)₃, (PrO)₃Si—CH₂—S—Si(Me)₂-S—CH₂—Si(OPr)₃, (PrO)₃Si—CH₂—S—Si(Et)₂-S—CH₂—Si(OPr)₃, (PrO)₃Si—CH₂—S—Si(Bu)₂-S—CH₂—Si(OPr)₃, (MeO)₃Si—CH₂—CMe₂-CH₂—S—Si(Me)₂-S—CH₂—CMe₂-CH₂—Si(OMe)₃, (MeO)₃Si—CH₂—CMe₂-CH₂—S—Si(Et)₂-S—CH₂—CMe₂-CH₂—Si(OMe)₃, (MeO)₃Si—CH₂—CMe₂-CH₂—S—Si(Bu)₂-S—CH₂—CMe₂-CH₂—Si(OMe)₃, (EtO)₃Si—CH₂—CMe₂-CH₂—S—Si(Me)₂-S—CH₂—CMe₂-CH₂—Si(OEt)₃, (EtO)₃Si—CH₂—CMe₂-CH₂—S—Si(Et)₂-S—CH₂—CMe₂-CH₂—Si(OEt)₃, (EtO)₃Si—CH₂—CMe₂-CH₂—S—Si(Bu)₂-S—CH₂—CMe₂-CH₂—Si(OEt)₃, (PrO)₃Si—CH₂—CMe₂-CH₂—S—Si(Me)₂-S—CH₂—CMe₂-CH₂—Si(OPr)₃, (PrO)₃Si—CH₂—CMe₂-CH₂—S—Si(Et)₂-S—CH₂—CMe₂-CH₂—Si(OPr)₃, (PrO)₃Si—CH₂—CMe₂-CH₂—S—Si(Bu)₂-S—CH₂—CMe₂-CH₂—Si(OPr)₃, (MeO)₃Si—CH₂—C(H)Me-CH₂—S—Si(Me)₂-S—CH₂—C(H)Me-CH₂—Si(OMe)₃, (MeO)₃Si—CH₂—C(H)Me-CH₂—S—Si(Et)₂-S—CH₂—C(H)Me-CH₂—Si(OMe)₃, (MeO)₃Si—CH₂—C(H)Me-CH₂—S—Si(Bu)₂-S—CH₂—C(H)Me-CH₂—Si(OMe)₃, (EtO)₃Si—CH₂—C(H)Me-CH₂—S—Si(Me)₂-S—CH₂—C(H)Me-CH₂—Si(OEt)₃, (EtO)₃Si—CH₂—C(H)Me-CH₂—S—Si(Et)₂-S—

CH₂—C(H)Me-CH₂—Si(OEt)₃, (EtO)₃Si—CH₂—C(H)Me-CH₂—S—Si(Bu)₂-S—CH₂—C(H)Me-CH₂—Si(OEt)₃, (PrO)₃Si—CH₂—C(H)Me-CH₂—S—Si(Me)₂-S—CH₂—C(H)Me-CH₂—Si(OPr)₃, (PrO)₃Si—CH₂—C(H)Me-CH₂—S—Si(Et)₂-S—CH₂—C(H)Me-CH₂—Si(OPr)₃, (PrO)₃Si—CH₂—C(H)Me-CH₂—S—Si(Bu)₂-S—CH₂—C(H)Me-CH₂—Si(OPr)₃, (MeO)₂(Me)Si—(CH₂)₃—S—Si(Me)₂-S—(CH₂)₃—Si(OMe)₂(Me), (MeO)₂(Me)Si—(CH₂)₃—S—Si(Et)₂-S—(CH₂)₃—Si(OMe)₂(Me), (MeO)₂(Me)Si—(CH₂)₃—S—Si(Bu)₂-S—(CH₂)₃—Si(OMe)₂(Me), (EtO)₂(Me)Si—(CH₂)₃—S—Si(Me)₂-S—(CH₂)₃—Si(OEt)₂(Me), (EtO)₂(Me)Si—(CH₂)₃—S—Si(Et)₂-S—(CH₂)₃—Si(OEt)₂(Me), (EtO)₂(Me)Si—(CH₂)₃—S—Si(Bu)₂-S—(CH₂)₃—Si(OEt)₂(Me), (PrO)₂(Me)Si—(CH₂)₃—S—Si(Me)₂-S—(CH₂)₃—Si(OPr)₂(Me), (PrO)₂(Me)Si—(CH₂)₃—S—Si(Et)₂-S—(CH₂)₃—Si(OPr)₂(Me), (PrO)₂(Me)Si—(CH₂)₃—S—Si(Bu)₂-S—(CH₂)₃—Si(OPr)₂(Me), (MeO)₂(Me)Si—(CH₂)₂—S—Si(Me)₂-S—(CH₂)₂—Si(OMe)₂(Me), (MeO)₂(Me)Si—(CH₂)₂—S—Si(Et)₂-S—(CH₂)₂—Si(OMe)₂(Me), (MeO)₂(Me)Si—(CH₂)₂—S—Si(Bu)₂-S—(CH₂)₂—Si(OMe)₂(Me), (EtO)₂(Me Si—(CH₂)₂—S—Si(Me)₂-S—(CH₂)₂—Si(OEt)₂(Me), (EtO)₂(Me)Si—(CH₂)₂—S—Si(Et)₂-S—(CH₂)₂—Si(OEt)₂(Me), (EtO)₂(Me)Si—(CH₂)₂—S—Si(Bu)₂-S—(CH₂)₂—Si(OEt)₂(Me), (Pro)₂(Me)Si—(CH₂)₂—S—Si(Me)₂-S—(CH₂)₂—Si(OPr)₂(Me), (PrO)₂(Me)Si—(CH₂)₂—S—Si(Et)₂-S—(CH₂)₂—Si(OPr)₂(Me), (Pro)₂(Me)Si—(CH)₂S—Si(Bu)₂S—(CH₂)₂—Si(OPr)₂(Me), (MeO)₂(Me)Si—CH₂—S—Si(Me)₂-S—CH₂—Si(OMe)₂(Me), (MeO)₂(Me)Si—CH₂—S—Si(Et)₂-S—CH₂—Si(OMe)₂(Me), (MeO)₂(Me)Si—CH₂—S—Si(Bu)₂-S—CH₂—Si(OMe)₂(Me), (EtO)₂(Me)Si—CH₂—S—Si(Me)₂-S—CH₂—Si(OEt)₂(Me), (EtO)₂(Me)Si—CH₂—S—Si(Et)₂-S—CH₂—Si(OEt)₂(Me), (EtO)₂(Me)Si—CH₂—S—Si(Bu)₂-S—CH₂—Si(OEt)₂(Me), (PrO)₂(Me)Si—CH₂—S—Si(Me)₂-S—CH₂—Si(OPr)₂(Me), (PrO)₂(Me)Si—CH₂—S—Si(Et)₂-S—CH₂—Si(OPr)₂(Me), (PrO)₂(Me)Si—CH₂—S—Si(Bu)₂S—CH₂—Si(OPr)₂(Me), (MeO)₂(Me)Si—CH₂—CMe₂CH₂—S—Si(Me)₂-S—CH₂—CMe₂-CH₂—Si(OMe)₂(Me), (MeO)₂(Me)Si—CH₂—CMe₂-CH₂S—Si(Et)₂S—CH₂—CMe₂-CH₂—Si(OMe)₂(Me), (MeO)₂(Me)Si—CH₂—CMe₂-CH₂S—Si(Bu)₂-S-CH₂—CMe₂-CH₂—Si(OMe)₂(Me), (EtO)₂(Me)Si—CH₂—CMe₂-CH₂—S—Si(Me)₂-S—CH₂—CMe₂-CH₂—Si(OEt)₂(Me), (EtO)₂(Me)Si—CH₂—CMe₂-CH₂—S—Si(Et)₂-S—CH₂—CMe₂-CH₂—Si(OEt)₂(Me), (EtO)₂(Me)Si—CH₂—CMe₂-CH₂—S—Si(Bu)₂-S—CH₂—CMe₂-CH₂—Si(OEt)₂(Me), (PrO)₂(Me)Si—CH₂—CMe₂-CH₂—S—Si(Me)₂—CH₂—CMe₂-CH₂—Si(OPr)₂(Me), (PrO)₂(Me)Si—CH₂—CMe₂-CH₂S—Si(Et)₂-S—CH₂CMe₂-CH₂—S(OPr)₂(Me), (PrO)₂(Me)Si—CH₂—CMe₂-CH₂—S—Si(Bu)₂-S—CH₂—CMe₂-CH₂—Si(OPr)₂(Me), (MeO)₂(Me)Si—CH₂—C(H)Me-CH₂—S—Si(Me)₂-S—CH₂—C(H)Me-CH₂—Si(OMe)₂(Me), (MeO)₂(Me)Si—CH₂—C(H)Me-CH₂—S—Si(Et)₂—CH₂—C(H)Me-CH₂—Si(OMe)₂(Me), (MeO)₂(Me)Si—CH₂—C(H)Me-CH₂—S—S(Bu)₂-S—CH₂—C(H)Me-CH₂—Si(OMe)₂(Me), (EtO)₂(Me)Si—CH₂—C(H)Me-CH₂—S—Si(Me)₂-S—CH₂—C(H)Me-CH₂—Si(OEt)₂(Me), (EtO)₂(Me)Si—CH₂—C(H)Me-CH₂—S—Si(Et)₂-S—CH₂—C(H)Me-CH₂—Si(OEt)₂(Me), (EtO)₂(Me)Si—CH₂—C(H)Me-CH₂—S—Si(Bu)₂-S—CH₂—C(H)Me-CH₂—Si(OEt)₂(Me), (PrO)₂(Me) Si—CH₂—C(H)Me-CH₂—S—Si (Me)₂-S—CH₂—C(H)Me-CH₂—Si(OPr)₂(Me), (PrO)₂(Me)Si—CH₂—C(H)Me-CH₂—S—Si(Et)₂-SCH₂—C(H)Me-CH₂—Si(OPr)₂(Me), (PrO)₂(Me)Si—CH₂—C(H)Me-CH₂S—Si(Bu)₂—CH₂—C(H)Me-CH₂—Si(OPr)₂ (Me), (MeO)₃Si—(CH₂)₃—S—Sn (Me)₂-S—(CH₂)₃—Si(OMe)₃, (MeO)₃Si—(CH₂)₃—S—Sn(Et)₂-S—(CH₂)₃—Si(OMe)₃, (MeO)₃Si—(CH₂)₃—S—Sn(Bu)₂-S—(CH₂)₃—Si(OMe)₃, (EtO)₃Si—(CH₂)₃—S—Sn(Me)₂-S—(CH₂)₃—Si(OEt)₃, (EtO)₃Si—(CH₂)₃—S—Sn(Et)₂-S—CH₂)₃—Si(OEt)₃, (EtO)₃Si—(CH₂)₃—S—Sn(Bu)₂-S—(CH₂)₃—Si(OEt)₃, (PrO)₃Si—(CH₂)₃—S—Sn(Me)₂-S—(CH₂)₃—Si(OPr), (PrO)₃Si—(CH₂)₃—S—Sn(Et)₂-S—(CH₂)₃—Si(OPr)₃, (PrO)₃Si—(CH₂)₃—S—Sn(Bu)₂-S—(CH₂)₃—Si(OPr)₃, (MeO)₃Si—(CH₂)₂—S—Sn(Me)₂-S(CH₂)₂—Si(OMe)₃, (MeO)₃Si—(CH₂)₂—S—Sn (Et)₂-S—(CH₂)₂—Si(OMe)₃, (MeO)₃Si—(CH₂)₂—S—Sn(Bu)₂-S—(CH₂)₂—Si(OMe)₃, (EtO)₃Si—(CH₂)₂—S—Sn(Me)₂-S—(CH₂)₂—Si(OEt)₃, (EtO)₃Si—(CH₂)₂—S—Sn(Et)₂-S—(CH₂)₂—Si(OEt)₃, (EtO)₃Si—(CH₂)₂—S—Sn(Bu)₂-S—(CH₂)₂—Si(OEt)₃, (PrO)₃Si—(CH₂)₂—S—Sn(Me)₂-S—(CH₂)₂—Si(OPr)₃, (PrO)₃Si—(CH₂)₂—S—Sn(Et)₂-S—(CH₂)₂—Si(OPr)₃, (PrO)₃Si—(CH₂)₂—S—Sn(Bu)₂-S—(CH₂)₂—Si(OPr)₃, (MeO)₃Si—CH₂—S—Sn(Me)₂-S—CH₂—Si(OMe)₃, (MeO)₃Si—CH₂—S—Sn(Et)₂-S—CH₂—Si(OMe)₃, (MeO)₃Si—CH₂—S—Sn(Bu)₂-S—CH₂—Si(OMe)₃, (EtO)₃Si—CH₂—S—Sn(Me)₂-S—CH₂—Si(OEt)₃, (EtO)₃Si—CH₂—S—Sn(Et)₂-S—CH₂—Si(OEt)₃, (EtO)₃Si—CH₂—S—Sn(Bu)₂-S—CH₂—Si(OEt)₃, (PrO)₃Si—CH₂—S—Sn(Me)₂-S—CH₂—Si(OPr)₃, (PrO)₃Si—CH₂—S—Sn(Et)₂-S—CH₂—Si(OPr)₃, (PrO)₃Si—CH₂—S—Sn(Bu)₂-S—CH₂—Si(OPr)₃, (MeO)₃Si—CH₂—CMe₂-CH₂—S—Sn(Me)₂-S—CH₂—CMe₂-CH₂—Si(OMe)₃, (MeO)₃Si—CH₂—CMe₂-CH₂—S—Sn(Et)₂-S—CH₂—CMe₂-CH₂—Si(OMe)₃, (MeO)₃Si—CH₂—CMe₂-CH₂—S—Sn(Bu)₂-S—CH₂—CMe₂-CH₂—Si(OMe)₃, (EtO)₃Si—CH₂—CMe₂-CH₂—S—Sn Me)₂-S—CH₂—CMe₂-CH₂—Si(OEt)₃, (EtO)₃Si—CH₂—CMe₂-CH₂—S—Sn(Et)₂-S—CH₂—CMe₂-CH₂—Si(OEt)₃, (EtO)₃Si—CH₂—CMe₂-CH₂—S—Sn(Bu)₂-S—CH₂—CMe₂-CH₂—Si(OEt)₃, (PrO)₃Si—CH₂—CMe₂-CH₂—S—Sn(Me)₂-S—CH₂—CMe₂-CH₂—Si(OPr)₃, (PrO)₃Si—CH₂—CMe₂-CH₂—S—Sn(Et)₂-S—CH₂—CMe₂-CH₂—Si(OPr)₃, (PrO)₃Si—CH₂—CMe₂-CH₂—S—Sn(Bu)₂-S—CH₂—CMe₂-CH₂—Si(OPr)₃, (MeO)₃Si—CH₂—C(H)Me-CH₂—S—Sn(Me)₂-S—CH₂—C(H)Me-CH₂—Si(OMe)₃, (MeO)₃Si—CH₂—C(H)Me-CH₂—S—Sn(Et)₂-S—CH₂—C(H)Me-CH₂—Si(OMe)₃, (MeO)₃Si—CH₂—C(H)Me-CH₂—S—Sn(Bu)₂-S—CH₂—C(H)Me-CH₂—Si(OMe)₃, (EtO)₃Si—CH₂—C(H)Me-CH₂—S—Sn(Me)₂-S—CH₂—C(H)Me-CH₂—Si(OEt)₃, (EtO)₃Si—CH₂—C(H)Me-CH₂—S—Sn(Et)₂-S—CH₂—C(H)Me-CH₂—Si(OEt)₃, (EtO)₃Si—CH₂—C(H)Me-CH₂—S—Sn(Bu)₂-S—CH₂—C(H)Me-CH₂—Si(OEt)₃, (PrO)₃Si—CH₂—C(H)Me-CH₂—S—Sn(Me)₂-S—CH₂—C(H)Me-CH₂—Si(OPr)₃, (PrO)₃Si—CH₂—C(H)Me-CH₂—S—Sn(Et)₂-S—CH₂—C(H)Me-CH₂—Si(OPr)₃, (PrO)₃Si—CH₂—C(H)Me-CH₂—S—Sn(Bu)₂-S—CH₂—C(H)Me-CH₂—Si(OPr)₃, (MeO)₂(Me)Si—(CH₂)₃—S—Sn(Me)₂-S—(CH₂)₃—Si(OMe)₂(Me), (MeO)₂(Me)Si—(CH₂)₃—S—Sn(Et)₂-S—(CH₂)₃—Si(OMe)₂(Me), (MeO)₂(Me)Si—(CH₂)₃—S—Sn(Bu)₂-S—(CH₂)₃—Si(OMe)₂(Me), (EtO)₂(Me)Si—(CH₂)₃—S—Sn(Me)₂-S—(CH₂)₃—Si(OEt)₂(Me), (EtO)₂(Me)Si—(CH₂)₃—S—Sn(Et)₂-S—(CH₂)₃—Si(OEt)₂(Me), (EtO)₂(Me)Si—(CH₂)₃—S—Sn(Bu)₂-S—(CH₂)₃—Si(OEt)₂(Me), (PrO)₂(Me)Si—(CH₂)₃—S—Sn(Me)₂-S—(CH₂)₃—Si(OPr)₂(Me), (Pro)₂(Me)Si—(CH₂)₃—S—Sn(Et)₂-S—(CH₂)₃—Si(OPr)₂(Me), (Pro)₂(Me)Si—(CH₂)₃—S—Sn(Bu)₂-S—(CH₂)₃—Si(OPr)₂(Me), (MeO)₂(Me)Si—(CH₂)₂—S—Sn(Me)₂-S—(CH₂)₂—Si(OMe)₂(Me), (MeO)₂(Me)Si—(CH₂)₂—S—Sn(Et)₂-S—(CH₂)₂—Si(OMe)₂(Me), (MeO)₂(Me)Si—(CH₂)₂—S—Sn(Bu)₂-S—(CH₂)₂—Si(OMe)₂(Me), (EtO)₂(Me)Si—(CH₂)₂—S—Sn(Me)₂-S—(CH₂)₂—Si(OEt)₂(Me), (EtO)₂(Me)Si—(CH₂)₂—S—Sn(Et)₂-S—(CH₂)₂—Si(OEt)₂(Me), (EtO)₂(Me)Si—(CH₂)₂—S—Sn(Bu)₂-S—(CH₂)₂—Si(OEt)₂(Me), (PrO)₂(Me)Si—(CH₂)₂—S—Sn(Me)₂-S—(CH₂)₂—Si(OPr)₂(Me), (PrO)₂(Me)Si—(CH₂)₂—S—Sn(Et)₂-S—(CH₂)₂—Si(OPr)₂(Me), (PrO)₂(Me)Si—(CH₂)₂—S—Sn(Bu)₂-S—(CH₂)₂—Si(OPr)₂(Me), (MeO)₂(Me)Si—

$CH_2$—S—Sn(Me)$_2$-S—$CH_2$—Si(OMe)$_2$(Me), (MeO)$_2$(Me)Si—$CH_2$—S—Sn(Et)$_2$-S—$CH_2$—Si(OMe)$_2$(Me), (MeO)$_2$(Me)Si—$CH_2$—S—Sn(Bu)$_2$-S—$CH_2$—Si(OMe)$_2$(Me), (EtO)$_2$(Me)Si—$CH_2$—S—Sn(Me)$_2$-S—$CH_2$—Si(OEt)$_2$(Me), (EtO)$_2$(Me)Si—$CH_2$—S—Sn(Et)$_2$-S—$CH_2$—Si(OEt)$_2$(Me), (EtO)$_2$(Me)Si—$CH_2$—S—Sn(Bu)$_2$-S—$CH_2$—Si(OEt)$_2$(Me), (PrO)$_2$(Me)Si—$CH_2$—S—Sn(Me)$_2$-S—$CH_2$—Si(OPr)$_2$(Me), (PrO)$_2$(Me)Si—$CH_2$—S—Sn(Et)$_2$-S—$CH_2$—Si(OPr)$_2$(Me), (PrO)$_2$(Me)Si—$CH_2$—S—Sn(Bu)$_2$-S—$CH_2$—Si(OPr)$_2$(Me), (MeO)$_2$(Me)Si—$CH_2$—$CMe_2$-$CH_2$—S—Sn(Me)$_2$S$CH_2$—$CMe_2$-$CH_2$—Si(OMe)$_2$(Me), (MeO)$_2$(Me)Si—$CH_2$—$CMe_2$-$CH_2$—S—Sn(Et)$_2$S—$CH_2$—$CMe_2$-$CH_2$—Si(OMe)$_2$(Me), (MeO)$_2$(Me)Si—$CH_2$—$CMe_2$-$CH_2$—S—Sn(Bu)$_2$-S—$CH_2$—$CMe_2$-$CH_2$—Si(OMe)$_2$(Me), (EtO)$_2$(Me)Si—$CH_2$—$CMe_2$-$CH_2$—S—Sn(Me)$_2$-S—$CH_2$—$CMe_2$-$CH_2$—Si(OEt)$_2$(Me), (EtO)$_2$(Me)Si—$CH_2$—$CMe_2$-$CH_2$—S—Sn(Et)$_2$-S—$CH_2$—$CMe_2$-$CH_2$—Si(OEt)$_2$(Me), (EtO)$_2$(Me)Si—$CH_2$—$CMe_2$-$CH_2$—S—Sn(Bu)$_2$-S—$CH_2$—$CMe_2$-$CH_2$—Si(OEt)$_2$(Me), (PrO)$_2$(Me)Si—$CH_2$—$CMe_2$-$CH_2$—S—Sn(Me)$_2$-S—$CH_2$—$CMe_2$-$CH_2$—Si(OPr)$_2$(Me), (PrO)$_2$(Me) Si—$CH_2$—$CMe_2$-$CH_2$—S—Sn(Et)$_2$-S—$CH_2$—$CMe_2$-$CH_2$—Si(OPr)$_2$(Me), (PrO)$_2$(Me)Si—$CH_2$—$CMe_2$-$CH_2$—S—Sn(Bu)$_2$-S—$CH_2$—$CMe_2$-$CH_2$—Si(OPr)$_2$(Me), (MeO)$_2$(Me)Si—$CH_2$—C(H)Me-$CH_2$—S—Sn (Me)$_2$-S—$CH_2$—C(H)Me-$CH_2$—Si(OMe)$_2$(Me), (MeO)$_2$(Me)Si—$CH_2$—C(H)Me-$CH_2$—S—Sn(Et)$_2$S—$CH_2$—C(H)Me-$CH_2$—Si(OMe)$_2$(Me), (MeO)$_2$(Me) Si—$CH_2$—C(H)Me-$CH_2$—S—Sn(Bu)$_2$-S—$CH_2$—C(H)Me-$CH_2$—Si(OMe)$_2$(Me), (EtO)$_2$(Me) Si—$CH_2$—C(H)Me-$CH_2$—S—Sn(Me)$_2$-S—$CH_2$—C(H)Me-$CH_2$—Si(OEt)$_2$(Me), (EtO)$_2$(Me)Si—$CH_2$—C(H)Me-$CH_2$—S—Sn (Et)$_2$-S—$CH_2$—C(H)Me-$CH_2$—Si(OEt)$_2$(Me), (EtO)$_2$(Me) Si—$CH_2$—C(H)Me-$CH_2$S—Sn(Bu)$_2$-S—$CH_2$—C(H)Me-$CH_2$Si(OEt)$_2$(Me), (PrO)$_2$(Me) Si—$CH_2$—C(H)Me-$CH_2$—S—Sn (Me)$_2$-S—$CH_2$—C(H)Me-$CH_2$—Si(OPr)$_2$(Me), (Pro)$_2$(Me) Si—$CH_2$—C(H)Me-$CH_2$S—Sn(Et)$_2$-S—$CH_2$—C(H)Me-$CH_2$—Si(OPr)$_2$(Me), and/or (PrO)$_2$(Me)Si—$CH_2$—C(H)Me-$CH_2$—S—Sn(Bu)$_2$-S—$CH_2$—C(H)Me-$CH_2$—Si(OPr)$_2$(Me).

Modified compounds of formula (2), as described above, are disclosed in more detail in WO2014/040639 which is entirely incorporated by reference.

In another embodiment, a compound of formula (3) may be used for the modification step (II).

$$(R_I O)_{x1'}(R_{II})_{y1'}Si—R_{IV}—S-E \qquad \text{formula (3)},$$

wherein $R_I$ and $R_{II}$ are independently selected from $C_1$-$C_8$ alkyl or $C_1$-$C_4$ alkoxy, provided that at least one of $R_I$ and $R_{II}$ are $C_1$-$C_4$ alkoxy; x1' is an integer selected from 1, 2, and 3; y1' is an integer selected from 0, 1 and 2; $R_{IV}$ is selected from $C_1$-$C_8$ alkyl; and E is $R_V$ or of formula (3a):

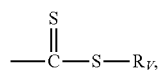

formula (3a)

wherein $R_V$ is $C_1$-$C_6$ alkyl, $C_6$-$C_{12}$ aryl, $C_7$-$C_{16}$ alkylaryl, or $C_7$-$C_{16}$ arylalkyl.

Preferably, in formula (3), each of $R_I$ and $R_{II}$ are independently $C_1$-$C_8$ alkoxy; $R_{IV}$ is selected from $C_1$-$C_4$ alkyl; and E is of formula (3a).

The above described compounds of formula (3) are disclosed in more detail in EP 2596 963 B1 which is entirely incorporated by reference.

In an alternative embodiment, one or more compound(s) of formula (11) to (15), as defined below, may be used for the modification step (II)

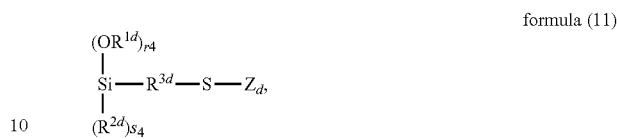

formula (11)

wherein each $R^{1d}$ is independently selected from ($C_1$-$C_{16}$) alkyl; each $R^{2d}$ is independently selected from ($C_1$-$C_{16}$) alkyl, ($C_6$-$C_{18}$) aryl and ($C_7$-$C_{18}$) aralkyl; $R^{3d}$ is independently selected from divalent ($C_1$-$C_{16}$) alkyl, divalent ($C_6$-$C_{18}$) aryl, divalent ($C_7$-$C_{18}$) aralkyl and —$R^{4d}$—O—$R^{5d}$—, wherein $R^{4d}$ and $R^{5d}$ are independently selected from divalent ($C_1$-$C_6$) alkyl; and $Z^d$ is independently selected from ($C_1$-$C_{16}$) alkyl, ($C_6$-$C_{18}$) aryl, ($C_7$-$C_{18}$) aralkyl, (C=S)—S—$R^{6d}$, wherein $R^{6d}$ is selected from ($C_1$-$C_{16}$) alkyl, ($C_6$-$C_{18}$) aryl and ($C_7$-$C_{18}$) aralkyl, and -$M^{1d}$($R^{7d}$)$_{c4}$($R^{8d}$)$_{d4}$, wherein Mid is silicon or tin, each $R^{7d}$ is independently selected from ($C_1$-$C_{16}$) alkyl, ($C_6$-$C_{18}$) aryl and ($C_7$-$C_{18}$) aralkyl; each $R^{8d}$ is independently selected from —S—$R^{3d}$—Si(O$R^{1d}$)$_{r4}$($R^{2d}$)$_{s4}$, wherein $R^{1d}$, $R^{2d}$ and $R^{3d}$ are as defined above, $r_4$ is an integer independently selected from 1, 2 and 3 and $s_4$ is an integer independently selected from 0, 1 and 2, with $r_4+s_4=3$; $c_4$ is an integer independently selected from 2 and 3; $d_4$ is an integer independently selected from 0 and 1; and $c_4+d_4=3$;

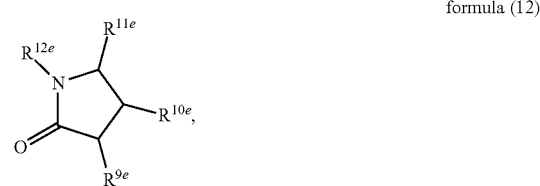

formula (12)

wherein $R^{9e}$, $R^{10e}$, $R^{11e}$ and $R^{12e}$ are independently selected from hydrogen, ($C_1$-$C_{16}$) alkyl, ($C_6$-$C_{16}$) aryl and ($C_7$-$C_{16}$) aralkyl, preferably N-methyl-pyrrolidon;

formula (13)

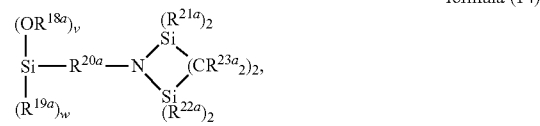

formula (14)

wherein each $R^{13a}$, $R^{14a}$, $R^{18a}$ and $R^{19a}$ is independently selected from ($C_1$-$C_{16}$) alkyl; $R^{15a}$ and $R^{20a}$ are independently selected from divalent ($C_1$-$C_{16}$) alkyl, divalent ($C_6$-$C_{18}$) aryl, divalent ($C_7$-$C_{18}$) aralkyl and —$R^{24a}$—O—$R^{25a}$—, wherein $R^{24a}$ and $R^{25a}$ are independently selected from divalent ($C_1$-$C_6$) alkyl; $R^{16a}$ and $R^{17a}$ are independently selected from ($C_1$-$C_{16}$) alkyl and —Si$R^{26a}R^{27a}R^{28a}$, wherein $R^{26a}$, $R^{27a}$ and $R^{28a}$ are independently selected from ($C_1$-$C_{16}$) alkyl, ($C_6$-$C_{18}$) aryl and ($C_7$-$C_{18}$) aralkyl; each $R^{21a}$ and $R^{22a}$ is independently selected from ($C_1$-$C_{16}$) alkyl, ($C_6$-$C_{18}$) aryl and ($C_7$-$C_{18}$) aralkyl; each $R^{23a}$ is independently selected from hydrogen and ($C_1$-$C_6$) alkyl; $t_1$ and v are integers independently selected from 1, 2 and 3; u1 and w are integers independently selected from 0, 1 and 2; $t_1+u_1=3$; and v+w=3;

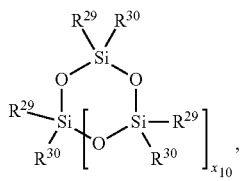

formula (15)

wherein each $R^{29}$ and $R^{30}$ is independently selected from ($C_1$-$C_{16}$) alkyl, ($C_6$-$C_{18}$) aryl, ($C_7$-$C_{18}$) alkylaryl and vinyl; and $x_{10}$ is an integer selected from 1 to 6.

Conditions for Modification

In the modification step (II) for the production of component (a), one or more modification compounds of formula (1) to (3) or formula (11) to (15), as defined above, may be added to the living polymer in an amount such that the molar ratio is of from 0.05 or more, preferably of from 0.1 or more, more preferably of from 0.15 or more.

The modification compounds represented by formula (1) to (3) or formula (11) to (15) are preferably added at almost complete or complete conversion of the monomer(s) to be polymerized, preferably at a conversion rate of the anionic polymerization of higher than 85 percent by weight, based on the amount of monomers provided. The phrase "amount of monomers provided", "charged amount of monomers", or similar terms, as used herein, refer to the amount of monomers provided in the polymerization method. In a preferred embodiment, the conversion rate is at least 92.0 percent by weight, preferably higher than 94.0 percent by weight based on the amount of monomers provided. The term "monomer conversion", as used herein, refers to the monomer conversion (for example the sum conversion of styrene and 1,3-butadiene) determined, e.g. at the outlet of a given polymerization reactor.

Preferably, a substantial amount of the living polymer chain ends is not terminated prior to the reaction with the modification compound, i.e. the living polymer chain ends are present and capable of reacting with the modification compound represented by formula (1) to formula (3) as well as by formula (11) to (15) in a polymer chain end modification reaction. It may be beneficial to change the polymer chain ends to dienyl chain ends before charge of the modification compounds by addition of small amounts of the conjugated diene monomer, such as 1,3-butadiene. In the course of the modification reaction, one or more polymer chain(s) may react with said modification compounds.

Thus, the modification reaction using a compound represented by formula (1) to (3) and/or formula (11) to (15), as described above, results in modified or functionalized elastomeric polymers. In one embodiment, these elastomeric polymers have a modification degree (mol % of modified chain-ends, based on the total number of produced macromolecules) of 20% or more, preferably 50% or more, most preferably 80% or more.

The modification compound represented by formula (1) to (3) and/or formula (11) to (15) may be directly added to the polymer solution without dilution. However, it may be beneficial to add the compounds represented by formula (1) to (3) and/or formula (11) to (15) in solution using an inert solvent, e.g. a solvent, as described above.

In general, it is to be understood that the terms "modification", or "functionalization" may be used interchangeably.

Randomizer Compounds

Randomizer compounds as conventionally known in the art (also known as polar coordinator compounds) may optionally be added to the monomer mixture or polymerization reaction, in order to adjust the microstructure (i.e. the content of vinyl bonds) of the conjugated diene part of the polymer and/or to adjust the distribution of any α-olefin monomer in the polymer chain. A combination of two or more randomizer compounds may be used.

Randomizer compounds useful in the invention are generally exemplified by Lewis base compounds. Suitable Lewis bases for use in the present invention are, for example, ether compounds, such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, 2-(2-ethoxyethoxy)-2-methylpropane, ($C_1$-$C_8$ alkyl)tetrahydrofurylethers (including methyltetrahydrofurylether, ethyltetrahydrofurylether, propyltetrahydrofurylether, butyltetrahydrofurylether, hexyltetrahydrofurylether and octyltetrahydrofurylether), tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amines such as triethylamine, pyridine, N,N,N',N'-tetramethyl-ethylenediamine, dipiperidinoethane, methyl ether of N,N-diethylethanolamine, ethyl ether of N,N-diethylethanolamine, N,N-diethylethanolamine and dimethyl N,N-tetrahydrofurfuryl amine. Examples of preferred randomizer compounds are identified in WO 2009/148932, which is incorporated herein by reference in its entirety.

Furthermore, potassium compounds can also be used as randomizer to achieve a defined incorporation of the α-olefin (vinyl) monomer in the polymer chain. Suitable potassium compounds can be selected from the groups of potassium alkoholates, potassium sulfonates, potassium carboxylates. Examples include potassium t-butylate, potassium t-amylate, potassium nonylphenolate, potassium-3,7-dimethyl-3-octylate, potassium dodecylbenzenesulfonate, potassium naphthalenesulfonate, potassium stearate, potassium decanoate and/or potassium naphthoate.

The randomizer compound will typically be added at a molar ratio of randomizer compound to initiator compound of from 0.012:1 to 10:1, preferably from 0.1:1 to 8:1 and more preferably from 0.25:1 to about 6:1.

Stabilizers

One or more stabilizers ("antioxidants") can optionally be added to the polymer after the termination of the polymerization process to prevent the degradation of the elastomeric polymer by molecular oxygen. Antioxidants based on sterically hindered phenols, such as 2,6-di-tert-butyl-4-methylphenol, 6,6'-methylenebis(2-tert-butyl-4-methylphenol), Iso-octyl-3-(3,5-di-tert-butyl-4-hydroxyphenyl) propionate, hexamethylenebis[3-(3,5-di-tert-butyl-4-hydroxyphenyl)-propionate], octadecyl-3-(3,5-di-tert-butyl-4-hydroxyphenyl) propionate, isotridecyl-3-(3,5-di-tert-butyl-4-hydroxyphenyl) propionate, 1,3,5-trimethyl-2,4,6-tris(3,5-di-tert-butyl-4-hydroxybenzyl) benzene, 2,2'-ethylidenebis-(4,6-di-tert-butylphenol), tetrakis[methylene-3-(3,5-di-tert-butyl-4-hydroxyphenyl)propionate]methane, 2-[1-(2-hydroxy-3, 5-di-tert-pentylphenyl)ethyl]-4, 6-di-tert-pentylphenyl acrylate and 2-tert-butyl-6-(3-tert-butyl-2-hydroxy-5-methylbenzyl)-4-methylphenyl acrylate, and antioxidants based on thio-esters, such as 4,6-bis(octylthiomethyl)-o-cresol and pentaerythrityl tetrakis(3-laurylthiopropionate), are typically used. Further examples of suitable stabilizers can be found in F. Röthemeyer, F. Sommer, Kautschuk Technologie, $2^{nd}$ ed., (Hanser Verlag, 2006) pages 340-344, and references cited therein.

Structure of the Elastomeric Polymer

In one embodiment, the elastomeric polymer (a) is thus a homopolymer obtainable by (I) anionic polymerization of conjugated dienes, preferably 1,3-butadiene or isoprene.

In another embodiment, the elastomeric polymer (a) is a random or block co- or terpolymer obtainable by (I) anionic polymerization of at least one conjugated diene, preferably 1,3-butadiene or isoprene, with at least one α-olefin monomer, preferably with styrene and/or divinylbenzene.

Thus, the elastomeric polymer (a) in the polymer blend is preferably a butadiene-polymer or a styrene-butadiene-copolymer (herein abbreviated as SBR) or a styrene-divinylbenzene-butadiene-terpolymer.

In one alternative embodiment, the elastomeric polymer (a) is thus a homopolymer obtainable by (I) anionic polymerization of conjugated dienes, preferably 1,3-butadiene or isoprene, and (II) modification of the homopolymer chains obtained in (I) by addition and reaction of one or more compounds represented by formula (1) to (3) as well as by formula (11) to (15), as defined above.

In another alternative embodiment, the elastomeric polymer (a) is a random or block co- or terpolymer obtainable by (I) anionic polymerization of at least one conjugated diene, preferably 1,3-butadiene or isoprene, with at least one α-olefin monomer, preferably with styrene and/or divinylbenzene, and (II) modification of the random or block co- or terpolymer chains obtained in (I) by addition and reaction of at least one or more compounds represented by formula (1) to (3) as well as by formula (11) to (15), as defined above.

Most preferably, the elastomeric polymer (a) is a styrene-butadiene-copolymer (herein abbreviated as SBR), a butadiene-(homo)polymer (herein abbreviated as BR) or a modified SBR or BR, as described above.

The elastomeric polymer (a), such as a styrene-butadiene-copolymer or a modified SBR, has a number average molecular weight (herein abbreviated as $M_n$) in the range of 400,000 to 2,000,000 g/mol, more preferably in the range of 450,000 to 1,500,000 g/mol, most preferably in the range of 500,000 to 800,000 g/mol, as measured by size exclusion chromatography (herein abbreviated as SEC) and converted to polystyrene equivalents.

The elastomeric polymer (a), such as a styrene-butadiene-copolymer or a modified SBR, has further a weight-average molecular weight (herein abbreviated as $M_w$) in the range of 500,000 to 3,000,000 g/mol, more preferably in the range of 600,000 to 1,500,000 g/mol, most preferably in the range of 800,000 to 1,100,000 g/mol, as measured by size exclusion chromatography (herein abbreviated as SEC) and converted to polystyrene equivalents.

$M_n$ and $M_w$ values below the indicated ranges lead to a less beneficial Mooney viscosity, higher cold flow and a higher rolling resistance after formulation and vulcanization of the polymer blend, as defined in the claims. In contrast, $M_n$ and $M_w$ values above the indicated ranges result in a deteriorated processability of both the elastomeric polymer (a) itself and the polymer blend, as defined in claim 1 and described above.

In other words, the elastomeric polymer (a), such as a styrene-butadiene-copolymer or a modified BR or SBR is a high molecular weight component, as defined above.

The weight ratio of the α-olefin, such as styrene, to the diene, such as 1,3-butadiene or isoprene, in the elastomeric polymer (a), as defined above, is preferably in the range of less than 50 percent by weight, more preferably less than 48 percent by weight, most preferably less than 45 percent by weight.

In one embodiment, the α-olefin-, such as styrene-, content of the elastomeric polymer (a), as defined above, ranges from 0 to 30 percent by weight. In another embodiment, the α-olefin-, such as styrene-, content of the elastomeric polymer (a), as defined above, ranges from 30 to 45 percent by weight. The term "α-olefin content" or "styrene-content", as used herein, refers to the mass (or weight) percentage of α-olefin or styrene in the elastomeric polymer (a), based on the total weight of the elastomeric polymer.

In one embodiment, the vinyl-content of the elastomeric polymer (a) is preferably from 5 to 80 percent by weight. The terms "vinyl content", as used herein, refers to the mass (or weight) percentage of the at least one diene, such as e.g. 1,3-butadiene and/or isoprene, that incorporates in the polymer chain of the elastomeric polymer (a) in the 1,2- and in the 1,2- or 3,4-position, respectively, and is based on the portion of diene, e.g. butadiene and/or isoprene (total amount of polymerized diene) in the elastomeric polymer. In a more preferred embodiment, the vinyl-content ranges from 8 to 65 percent by weight.

The amount of component (a) in the polymer blend, as defined in claim 1, is in the range of 60 to 96 percent by weight, more preferably 70 to 90 percent by weight, based on the total weight of the polymer blend.

It is further preferred that the elastomeric polymer (a) in the polymer blend according to the invention has a glass transition temperature (herein abbreviated as $T_g$) of −95° C. to 5° C., as measured by DSC (see test methods below).

Component (b)—an Aromatic Hydrocarbon Polymer Having a Low Molecular Weight

An "aromatic hydrocarbon polymer" according to the invention is a polymer, obtainable by polymerization of at least one aromatic monomer according to standard procedures.

The polymerization reaction may be selected from radical polymerization, anionic polymerization, or cationic polymerization.

Suitable examples of aromatic monomers for the preparation of the aromatic hydrocarbon polymer include, but are not limited to, styrene and its derivatives, including, without limitation, $C_{1-4}$ alkyl substituted styrenes, such as 2-methylstyrene, 3-methylstyrene, 4-methylstyrene, 2,4-dimethylstyrene, 2,4,6-trimethylstyrene, α-methylstyrene, and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, divinylbenzene and its derivatives, coumarone, indene and/or mixtures thereof. Most preferably, styrene, α-methylstyrene, divinylbenzene or a combination thereof is used.

Preferably, the aromatic hydrocarbon polymer is prepared by an anionic polymerization method in the presence of a polymerization initiator in an organic solvent.

For the specific condition(s) for an anionic polymerization reaction, reference is made to the above described polymerization reaction (I) for the preparation of component (a). Thus, the condition(s) applied for the preparation of component (b) are typically the same as disclosed above for the elastomeric polymer, i.e. component (a) (see also WO 2009/148932).

Most preferably, the polymerization initiator for the anionic polymerization of component (b) is selected from N-butyl lithium, and sec-butyl lithium, the reaction temperature is preferably above 0° C., more preferably above 10° C., and most preferably above 20° C., and the solvent is selected from cyclohexane, toluene, butene, butane and combinations thereof. Most preferably, a randomizer compound (also known as polar coordinator compound or polar agent), such as 2,2-ditetrahydrofurylether (DTHFP), or N,N,N',N'-tetramethyl-ethylenediamine (TMEDA), is used.

Preferably, the aromatic hydrocarbon polymer (b) in the polymer blend according to the invention is a polystyrene-polymer. It is also possible to use petroleum-based resins or coumarone-indene resins, if the molecular weight and the $T_g$ is in the defined range (see below).

The amount of component (b) in the polymer blend, as defined in claim 1, is in the range of 4 to 35 percent by weight, more preferably 10 to 30 percent by weight, most preferably 13 to 25 percent by weight, based on the total weight of the polymer blend.

The aromatic hydrocarbon polymer (b) has a number average molecular weight (herein abbreviated as $M_n$) in the range of 250 to 1,500 g/mol, more preferably in the range of 400 to 1,400 g/mol, most preferably in the range of 700 to 1,350 g/mol, as measured by size exclusion chromatography (herein abbreviated as SEC) and converted to polystyrene equivalents.

The aromatic hydrocarbon polymer (b) has further a weight-average molecular weight (herein abbreviated as $M_w$) in the range of 350 and 2,500 g/mol, more preferably in the range of 600 to 2,000 g/mol, most preferably in the range of 800 to 1,700 g/mol, as measured by size exclusion chromatography (herein abbreviated as SEC) and converted to polystyrene equivalents.

In other words, the aromatic hydrocarbon polymer component (b) has to be of low molecular weight, as defined above.

In the polymer blend, the aromatic hydrocarbon polymer component (b) may have a glass transition temperature (herein abbreviated as $T_g$) of −15° C. to 30° C., as measured by DSC (see test methods below).

Component (c)—an Optionally Present (Conventional) Extender Oil Having a Low Molecular Weight Component (c) of the polymer blend, as defined in claim 1, is optionally present and corresponds to one or more extender oil(s), which are also known as softener(s).

The amount of component (c) in the polymer blend, if present, is in the range of 0 to 13 percent by weight, based on the total weight of the polymer blend. If a higher amount of component (c) is used, the parameter attributes of the crosslinked vulcanizates, comprising the polymer blend, as defined herein, especially the abrasion resistance and the grip of the polymer blend/polymer composition deteriorate, as shown in the examples.

For representative examples and classification of the extender oils, reference is made to International Patent Application No. PCT/US09/045553 and U.S. Patent Application Publication No. 2005/0159513, each of which is incorporated herein by reference in its entirety. Representative extender oils include, but are not limited to, MES (Mild Extraction Solvate), TDAE (Treated Distillate Aromatic Extract), RAE (Residual Aromatic Extract) including, without limitation, T-RAE and S-RAE, DAE including T-DAE and NAP (light and heavy naphthenic oils), including, but not limited to, Nytex 4700, Nytex 8450, Nytex 5450, Nytex 832, Tufflo 2000, and Tufflo 1200. In addition, native oils, including, but not limited to, vegetable oils, can be used as extender oils.

Representative oils also include functionalized variations of the aforementioned oils, particularly epoxidized or hydroxylated oils. The aforementioned extender oils comprise different concentrations of polycyclic aromatic compounds, paraffinics, naphthenics and aromatics, and have different glass transition temperatures. The above mentioned types of oil have been characterized (*Kautschuk Gummi Kunststoffe*, vol. 52, pages 799-805). In preferred embodiments, MES, RAE and/or TDAE are used as (conventional) extender oils.

Preparation of the Polymer Blend

The polymer blend according to the invention is prepared in solution either by in situ polymerization of both components (a) and (b), i.e. the elastomeric polymer (a) as well as the aromatic hydrocarbon polymer (b), as described above, in the same process or by mixing of the respective polymer solutions, as obtained after the polymerization reaction (including the modification reaction, if applicable) of the corresponding components, i.e. the elastomeric polymer (a) as well as the aromatic hydrocarbon polymer (b), as described above. The optional extender oil(s) (c), if used at all, are then mixed into the obtained polymer solution, containing both the elastomeric polymer (a) as well as the aromatic hydrocarbon polymer (b).

The amounts of each component are as defined in claim 1.

The polymer blend is then recovered from the polymer blend solution as usual known and used in industrial scale for rubber production for instance via steam stripping at an elevated temperature, preferably about 100° C., followed by a usual dewatering step and drying at elevated temperatures.

Specific Polymer Blends According to the Invention

The following alternative embodiments represent specific polymer blends according to the invention:

In a first embodiment, the polymer blend according to the invention consists of (a) 60 to 96 percent by weight of an elastomeric polymer, and (b) 4 to 35 percent by weight of an aromatic hydrocarbon polymer, preferably a polystyrene-polymer; wherein the elastomeric polymer is obtainable by (I) anionic polymerization of (I-1) at least one conjugated diene monomer in the presence of a polymerization initiator in an organic solvent; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight ($M_n$) of 250 to 1,500 g/mol, and a weight-average molecular weight ($M_w$) of 350 to 2,500 g/mol; and wherein the amounts of the components (a), and (b) are based on the total weight of the polymer blend.

In a second embodiment, the polymer blend according to the invention consists of (a) 60 to 96 percent by weight of an elastomeric polymer, and (b) 4 to 35 percent by weight of an aromatic hydrocarbon polymer, preferably a polystyrene-polymer; wherein the elastomeric polymer is obtainable by (I) anionic polymerization of (I-2) at least one conjugated diene monomer and one or more α-olefin monomer(s) in the presence of a polymerization initiator in an organic solvent; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol; and wherein the amounts of the components (a), and (b) are based on the total weight of the polymer blend.

In a third embodiment, the polymer blend according to the invention consists of (a) 60 to 96 percent by weight of an elastomeric polymer, and (b) 4 to 35 percent by weight of an aromatic hydrocarbon polymer, preferably a polystyrene-polymer; wherein the elastomeric polymer is obtainable by (I) anionic polymerization of (I-1) at least one conjugated diene monomer in the presence of a polymerization initiator in an organic solvent, and (II) modification of the polymer chain ends obtained in (I) by addition and reaction of at least one compound represented by formula (1) to formula (3) and/or formula (11) to formula (15), as defined in claim 1; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol; and wherein the amounts of the components (a), and (b) are based on the total weight of the polymer blend.

In a fourth embodiment, the polymer blend according to the invention consists of (a) 60 to 96 percent by weight of an elastomeric polymer, preferably a styrene-butadiene-polymer, and (b) 4 to 35 percent by weight of an aromatic hydrocarbon polymer, preferably a polystyrene-polymer; wherein the elastomeric polymer is obtainable by (I) anionic polymerization of (I-2) at least one conjugated diene monomer and one or more α-olefin monomer(s) in the presence of a polymerization initiator in an organic solvent, and (II) modification of the polymer chain ends obtained in (I) by addition and reaction of at least one compound represented by formula (1) to formula (3) and/or formula (11) to formula (15), as defined in claim 1; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol, and wherein the amounts of the components (a), and (b) are based on the total weight of the polymer blend.

In a fifth embodiment, the polymer blend according to the invention consists of (a) 60 to 96 percent by weight of an elastomeric polymer, (b) 4 to 35 percent by weight of an aromatic hydrocarbon polymer, preferably a polystyrene-polymer, and (c) 0 to 13 percent by weight of one or more extender oil(s); wherein the elastomeric polymer is obtainable by (I) anionic polymerization of (I-1) at least one conjugated diene monomer in the presence of a polymerization initiator in an organic solvent; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight ($M_n$) of 250 to 1,500 g/mol, and a weight-average molecular weight ($M_w$) of 350 to 2,500 g/mol; and wherein the amounts of the components (a), (b), and (c) are based on the total weight of the polymer blend.

In a sixth embodiment, the polymer blend according to the invention consists of (a) 60 to 96 percent by weight of an elastomeric polymer, (b) 4 to 35 percent by weight of an aromatic hydrocarbon polymer, preferably a polystyrene-polymer, and (c) 0 to 13 percent by weight of one or more extender oil(s); wherein the elastomeric polymer is obtainable by (I) anionic polymerization of (I-2) at least one conjugated diene monomer and one or more α-olefin monomer(s) in the presence of a polymerization initiator in an organic solvent; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol; and wherein the amounts of the components (a), (b), and (c) are based on the total weight of the polymer blend.

In a seventh embodiment, the polymer blend according to the invention consists of (a) 60 to 96 percent by weight of an elastomeric polymer, (b) 4 to 35 percent by weight of an aromatic hydrocarbon polymer, preferably a polystyrene-polymer, and (c) 0 to 13 percent by weight of one or more extender oil(s); wherein the elastomeric polymer is obtainable by (I) anionic polymerization of (I-1) at least one conjugated diene monomer in the presence of a polymerization initiator in an organic solvent, and (II) modification of the polymer chain ends obtained in (I) by addition and reaction of at least one compound represented by formula (1) to formula (3) and/or formula (11) to formula (15), as defined in claim 1; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol; and wherein the amounts of the components (a), (b), and (c) are based on the total weight of the polymer blend.

In an eighth embodiment, the polymer blend according to the invention consists of (a) 60 to 96 percent by weight of an elastomeric polymer, preferably a styrene-butadiene-polymer, (b) 4 to 35 percent by weight of an aromatic hydrocarbon polymer, preferably a polystyrene-polymer, and (c) 0 to 13 percent by weight of one or more extender oil(s); wherein the elastomeric polymer is obtainable by (I) anionic polymerization of (I-2) at least one conjugated diene monomer and one or more α-olefin monomer(s) in the presence of a polymerization initiator in an organic solvent, and (II) modification of the polymer chain ends obtained in (I) by addition and reaction of at least one compound represented by formula (1) to formula (3) and/or formula (11) to formula (15), as defined in claim 1; wherein the elastomeric polymer (a) has a number average molecular weight ($M_n$) of 400,000 to 2,000,000 g/mol, and a weight-average molecular weight ($M_w$) of 500,000 to 3,000,000 g/mol; wherein the second polymer (b) has a number average molecular weight (Mn) of 250 to 1,500 g/mol, and a weight-average molecular weight (Mw) of 350 to 2,500 g/mol, and wherein the amounts of the components (a), (b), and (c) are based on the total weight of the polymer blend.

The Polymer Composition

The present invention further provides a polymer composition, comprising the polymer blend of the first aspect of the invention, as described above.

In one embodiment, the polymer composition of the invention may also comprise one or more filler(s), which serve as reinforcement agents. Examples of suitable fillers include, without limitation, carbon black (including electro-conductive carbon black), carbon nanotubes (CNT) (including discrete CNT, hollow carbon fibers (HCF) and modified CNT carrying one or more functional groups, such as hydroxyl, carboxyl and carbonyl groups) graphite, graphene (including discrete graphene platelets), silica, carbon-silica dual-phase filler, clays including layered silicates, calcium carbonate, magnesium carbonate, lignin, amorphous fillers, such as glass particle-based fillers, starch-based fillers, and combinations thereof. Further examples of suitable fillers are described in WO 2009/148932 which is incorporated herein by reference in its entirety.

Examples of suitable carbon black include, without limitation, the one conventionally manufactured by a furnace method, for example having a nitrogen adsorption specific surface area of 50-200 $m^2/g$ and DBP oil absorption of 80-200 mL/100 grams, such as carbon black of the FEF, HAF, ISAF or SAF class, and electroconductive carbon black. In some embodiments, high agglomeration-type carbon black is used. Carbon black is typically used in an amount of from 2 to 100 parts by weight, or 5 to 100 parts by weight, or 10 to 100 parts by weight, or 10 to 95 parts by weight per 100 parts by weight of the total polymer.

Examples of suitable silica fillers include, without limitation, wet process silica, dry process silica and synthetic silicate-type silica. Silica with a small particle diameter and high surface area exhibits a high reinforcing effect. Small diameter, high agglomeration-type silica (i.e. having a large surface area and high oil absorptivity) exhibits excellent dispersibility in the polymer composition, resulting in superior processability. An average particle diameter of silica in terms of the primary particle diameter may be from 5 to 60 nm, more preferably 10 to 35 nm. The specific surface area of the silica particles (measured by the BET method) may be from 35 to 300 $m^2/g$. Silica is typically used in an amount of from 10 to 150 parts by weight, or 30 to 130 parts by weight, or 50 to 130 parts by weight per 100 parts by weight of the total polymer.

Silica fillers can be used in combination with other fillers, including, without limitation, carbon black, carbon nanotubes, carbon-silica dual-phase-filler, graphene, graphite, clay, calcium carbonate, magnesium carbonate and combinations thereof.

Carbon black and silica may be added together, in which case the total amount of carbon black and silica is from 30 to 150 parts by weight or 50 to 150 parts by weight per 100 parts by weight of the total polymer.

Carbon-silica dual-phase filler is so called silica-coated carbon black made by coating silica on the surface of carbon black and commercially available under the trademark CRX2000, CRX2002 or CRX2006 (products of Cabot Co.). Carbon-silica dual-phase filler is added in the same amounts as described above with respect to silica.

In another embodiment, the polymer composition comprising the polymer blend according to the invention may optionally comprise one or more vulcanizing agent(s) (or crosslinking agent(s)). The terms "vulcanizing agent" and "crosslinking agent" (or "vulcanizing" and "crosslinking", respectively) are used herein interchangeably.

Sulfur, sulfur-containing compounds acting as sulfur-donors, sulfur-accelerator systems, and peroxides are the most common vulcanizing agents. Examples of sulfur-containing compounds acting as sulfur-donors include, but are not limited to, dithiodimorpholine (DTDM), tetramethylthiuramdisulfide (TMTD), tetraethylthiuramdisulfide (TETD), and dipentamethylenthiuramtetrasulfide (DPTT). Examples of sulfur accelerators include, but are not limited to, amine derivatives, guanidine derivatives, aldehydeamine condensation products, thiazoles, thiuram sulfides, dithiocarbamates, and thiophosphates. Examples of peroxides used as vulcanizing agents include, but are not limited to, di-tert.-butyl-peroxides, di-(tert.-butyl-peroxy-trimethyl-cyclohexane), di-(tert.-butyl-peroxy-isopropyl-)benzene, dichloro-benzoylperoxide, dicumylperoxides, tert.-butyl-cumyl-peroxide, dimethyl-di(tert.-butyl-peroxy)hexane and dimethyl-di(tert.-butyl-peroxy)hexane and butyl-di(tert.-butyl-peroxy)valerate (*Polymer Handbook, SGF, The Swedish Institution of Polymer Technology* 2000). Further examples and additional information regarding vulcanizing agents can be found in Kirk-Othmer, *Encyclopedia of Chemical technology* $3^{rd}$, Ed., (Wiley Interscience, N.Y. 1982), volume 20, pp. 365-468, (specifically "Vulcanizing Agents and Auxiliary Materials" pp. 390-402).

In addition, the polymer composition comprising the polymer blend according to the invention may also include up to 10 percent by weight of one or more extender oil(s), based on the total weight of the polymer composition. Extender oil(s) have already been described above.

A vulcanizing accelerator of sulfene amide-type, guanidine-type, or thiuram-type may be used together with a vulcanizing agent, as required. Other additives such as zinc white, vulcanization auxiliaries, aging preventives, processing adjuvants, and the like may be optionally added. A vulcanizing agent is typically added to the polymer composition in an amount from 0.5 to 10 parts by weight and, in some preferred embodiments, from 1 to 6 parts by weight for 100 parts by weight of the total elastomeric polymer. Examples of vulcanizing accelerators, and the amount of accelerator added with respect to the total polymer, are given in International Patent Publication No. WO 2009/148932. Sulfur-accelerator systems may or may not comprise zinc oxide. Preferably, zinc oxide is applied as component of the sulfur-accelerator system.

In some embodiments, a silane coupling agent (used for compatibilization of polymer and fillers) may be added to the polymer composition comprising the polymer blend according to the invention and silica, layered silicate (such as magadiite) or carbon-silica dual-phase filler. The typical amount of a silane coupling agent added is from about 1 to about 20 parts by weight and, in some embodiments, from about 5 to about 15 parts by weight for 100 parts by weight of the total amount of silica and/or carbon-silica dual-phase filler.

Silane coupling agents can be classified according to the *Fritz Röthemeyer, Franz Sommer: Kautschuk Technologie*, (Carl Hanser Verlag 2006):

(A) bifunctional silanes including, without limitation, Si 230 $(EtO)_3Si(CH_2)_3Cl$, Si 225 $(EtO)_3SiCH=CH_2$, A189 $(EtO)_3Si(CH_2)_3SH$, Si 69 $[(EtO)_3Si(CH_2)_3S_2]_2$, Si 264 $(EtO)_3Si-(CH_2)_3SCN$, and Si 363 $(EtO)Si((CH_2-CH_2O)_5(CH_2)_{12}CH_3)_2(CH_2)_3SH)$ (Evonic Industries AG); and (B) monofunctional silanes including, without limitation, Si 203 $(EtO)_3-Si-C_3H_7$, and Si 208 $(EtO)_3-Si-C_8H_{17}$.

Further examples of silane coupling agents are given in International Patent Application No. PCT/US2009/045553, and include, but are not limited to, bis-(3-hydroxy-dimethylsilyl-propyl)tetrasulfide, bis-(3-hydroxy-dimethylsilyl-propyl)-disulfide, bis-(2-hydroxy-dimethylsilyl-ethyl)tetrasulfide, bis-(2-hydroxy-dimethylsilyl-ethyl)disulfide, 3-hydroxy-dimethylsilyl-propyl-N,N-dimethylthiocarbamoyltetrasulfide, and 3-hydroxy-dimethylsilyl-propylbenzothiazole-tetrasulfide.

A Method for the Preparation of the Crosslinked Elastomeric Polymer

In yet another aspect, the present invention thus relates to a method for the preparation of a crosslinked elastomeric polymer, said method comprising the following steps: (1) Providing the polymer blend according to the first aspect of the invention or the polymer composition according to the second aspect of the invention; (2) adding one or more filler(s) and optionally at least one or more silane coupling agent(s); and compounding said mixture; and (3) adding a vulcanizing agent and optionally at least one or more vulcanizing accelerator(s) to the mixture of step (2); and cross-linking said mixture.

Steps (1) to (3) relate to the compounding of the polymer blend or the polymer composition, comprising the polymer blend, according to the invention and vulcanizing the polymer composition, comprising the polymer blend, and may be conducted using conventional compounding/vulcanization equipment. Conventional filler(s), silane coupling agent(s), vulcanizing agent(s) and vulcanizing accelerator(s) to be used in the method for the preparation of a crosslinked elastomeric polymer have already been described above.

Crosslinked Elastomeric Polymer, Article and Polymer Kit

The invention further is directed to crosslinked elastomeric polymers obtainable according to the above described method.

Moreover, the present invention relates to articles, comprising (I.1) the polymer composition, comprising the polymer blend according to the invention, or (I.2) said cross-linked elastomeric polymer obtainable according to the above described method. In a preferred embodiment, the article according to the present invention is a tire, a tire tread, a tire side wall, a conveyer belt, a seal or a hose. Moreover, the present invention relates to polymer kits, comprising (II.1) the polymer blend according to the invention, or (II.2) the polymer composition according to the invention.

Definitions

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, etc., branched alkyl groups, such as isopropyl, tert-butyl, etc., and cyclic alkyl groups, such as cyclohexyl.

Alkoxy groups as defined herein include methoxy (MeO), ethoxy (EtO), propoxy (PrO), butoxy (BuO), isopropoxy, isobutoxy, pentoxy, and the like.

Aryl groups, as defined herein, include phenyl, and biphenyl compounds. Aryl groups preferably contain only one aromatic ring and most preferably contain a $C_6$ aromatic ring, i.e. benzene.

Alkylaryl groups, as defined herein, refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

A homopolymer or copolymer, as defined herein, may comprise a minor amount of a second or third monomer, such as e.g. divinylbenzene, in the range of up to 1 percent by weight, based on the total weight of the polymer.

EXAMPLES

The following examples are provided in order to further illustrate the invention and are not to be construed as limitation of the present invention. "Room temperature" refers to a temperature of about 20° C. All polymerizations were performed in a nitrogen atmosphere under exclusion of moisture and oxygen.

Test Methods

Size Exclusion Chromatography

Molecular weight and molecular weight distribution of the polymer were each measured using size exclusion chromatography (SEC) based on polystyrene standards. Each polymer sample (9 to 11 mg) was dissolved in tetrahydrofuran (10 mL) to form a solution. The solution was filtered using a 0.45-μm filter. A 100-μL sample was fed into a GPC column (Hewlett Packard system 1100 with 3 PLgel 10 μm MIXED-B columns). Refraction Index-detection was used as the detector for analyzing the molecular weight. The molecular weight was calculated as polystyrene based on the calibration with EasiCal PS1 (Easy A and B) Polystyrene standards from Polymer Laboratories. The number-average molecular weight ($M_n$) figures and the weight-average molecular weight ($M_w$) figures are given based on the polystyrene standards. The molecular weight distribution is expressed as the dispersity $D=M_w/M_n$.

Analysis to Measure Monomer Conversion

Monomer conversion was determined by measuring the solids concentration (TSC) of the polymer solution at the end of the polymerization. The maximum solid content is obtained at 100 wt % conversion of the charged butadiene ($m_{Bd}$) and styrene ($m_{St}$) for the final polymer by $TSC_{max}= (m_{Bd}+m_{St})/(m_{Bd}+m_{St}+m_{polar\ agent}+m_{NBL}+m_{cyclohexane})*100\%$. A sample of polymer solution ranging from about 1 g to about 10 g, depending on the expected monomer conversion, was drawn from the reactor directly into a 200-mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, ϕ 90 mm, MUNKTELL, weight "C"), dried at 140° C., using a moisture analyzer HR73 (Mettler-Toledo) until a mass loss of less than 1 mg within 140 seconds was achieved. Finally, a second drying period was performed using switch-off at a mass loss of less than 1 mg within 90 seconds to obtain the final mass "D" of the dry sample on the paper filter. The polymer content in the sample was calculated as TSC=(D−C)/(B−A)*100%. The final monomer conversion was calculated as TSC/TSC max*100%.

Measurement of the Glass (Transition) Temperature $T_g$

The glass transition temperature was determined using a DSC Q2000 device (TA instruments), as described in ISO 11357-2 (1999) under the following conditions:

Weight: ca. 10-12 mg;
Sample container: standard alumina pans;
Temperature range: (−140 . . . 80°)° C.;
Heating rate: 20 K/min;
Cooling rate: free cooling;
Purge gas: 20 ml Ar/min;
Cooling agent: liquid nitrogen;
Evaluation method: inflection method.

Each sample was measured at least once. The measurements contained two heating runs. The $2^{nd}$ heating run was used to determine the glass transition temperature.

$^1$H-NMR

Vinyl and total styrene content were measured using $^1$H-NMR, following ISO 21561-2005, using a NMR spectrometer IBRUKER Avance (400 MHz), and a 5-mm dual probe. $CDCl_3$/TMS was used as solvent in a weight ratio of 0.05%:99.95%.

Measurement of VOC Emissions

The volatile organic compound (VOC) emissions were compared using RTG 220. A specimen of each of the received samples was heated from room temperature up to 800° C. at 10 K/min under inert gas purge. Appearing mass changes and thermal effects were recorded.

Measurement of Rheological Properties

Measurements of non-vulcanized rheological properties according to ASTM D 5289-95 were made using a rotor-less shear rheometer (MDR 2000 E) to characterize cure characteristics, especially the time to cure (t95). The "t95" times are the respective times required to achieve 95% conversion of the vulcanization reaction.

Vulcanizate Compound Properties

Test pieces were vulcanized by t95 at 160° C. for measurement of DIN abrasion, tensile strength and tan δ.

Tensile Strength and Moduli

Tensile strength and moduli were measured according to ASTM D 412 on a Zwick Z010.

Abrasion

DIN abrasion was measured according to DIN 53516 (1987-06-01). The larger the value, the lower the wear resistance.

Hardness Shore a and Rebound Resilience

Hardness Shore A (ASTM D 2240) and rebound resilience (ISO 4662) were measured at 0° C., RT and 60° C.

Loss Factor Tan δ

The loss factor tan δ (also known as "tan d") was measured at 0° C. and 60° C. using a dynamic spectrometer Eplexor 150N/500N manufactured by Gabo Qualimeter Testanlagen GmbH (Germany) applying a tension dynamic strain of 1% at a frequency of 2 Hz.

Preparation of the Polymers

High Molecular Weight Polymer A

Four batches were performed according to the following procedure. Dry cyclohexane ($m_{cyclohexane}$=20642 g) was added to an air-free, nitrogen-purged 40-L stainless steel reactor. 1,3-Butadiene ($m_{Bd}$=677 g), styrene ($m_{st}$=941 g), and TMEDA (polar agent, 4.72 mmol) were fed into the reactor (TMEDA/active n-butyl lithium mol/mol=1.12). The mixture was heated up to 55° C. with stirring. The impurities in the system were titrated by stepwise addition of n-butyl lithium. Recognizing the endpoint, the polymerization was started by the addition of an amount corresponding to the target molecular weight of 540 kg/mol (n-butyl lithium NBL 4.19 mmol of n-butyl lithium (15% solution in cyclohexane) via pump within 2 minutes. Then the polymerization started. The temperature in the reactor increased to 85° C. within 30 minutes and then hold constant at this temperature. Butadiene (677 g) was charged during 60 minutes to the reaction mixture starting 15 minutes after n-butyl lithium charge. Tetramethoxysilane was charged 30 minutes later as coupling agent. The remaining living polymer chains were terminated 20 minutes later by charge of methanol. 4,6-bis (octylthiomethyl)-o-cresol sold under the tradename IRGANOX 1520 (Ciba, 0.2 phr) was introduced as an antioxidant. The four batches were mixed and the resulting polymer was analyzed by GPC: $M_n$=659617, $M_w$=1004402, D=1.52. The microstructure and styrene block content were measured by 1H-NMR. The following results were obtained: styrene=39.6%, vinyl (1,2-polybutadiene, calculated on the butadiene fraction)=24.2%, styrene block portion below 5% of the total styrene. The $T_g$ was found to be −31° C.

High Molecular Weight Polymer B

Dry cyclohexane (19628 g) was added to an air-free, nitrogen-purged 40-L stainless steel reactor. 1,3-Butadiene (2269 g), styrene (617 g), tetramethylethylenediamine (TMEDA) (32.44 mmol) and divinylbenzene (DVB) (1.644 mmol) were fed into the reactor. The mixture was heated up to 40° C. with stirring. The impurities in the system were titrated by stepwise addition of n-butyl lithium. Recognizing the endpoint, the polymerization was started by the addition of an amount corresponding to the target molecular weight of 350 kg/mol (8.34 mmol of n-butyl lithium (0.119 mol/kg solution in cyclohexane) via pump within 2 minutes. Then, the polymerization started. The temperature in the reactor increased to 60° C. within 60 minutes and was then hold constant at this temperature. 3-tert-butyldimethylsilylthiopropyltrimethoxysilane (2.19 mmol) was charged 115 minutes later as coupling agent. Butadiene (46.7 g) was added 30 minutes later and the remaining living polymer chains were modified after that by charge of 3-tert. butyldimethylsilylthiopropyldimethoxymethylsilane (5.89 mmol). Finally, methanol was charged 30 minutes later (41 g) and 4,6-bis (octylthiomethyl)-o-cresol sold under the tradename IRGANOX 1520 (Ciba, 0.2 phr) was introduced as an antioxidant. The resulting polymer was analyzed by GPC: $M_n$=581830, $M_w$=892501, D=1.53. The microstructure and styrene block content were measured by 1H-NMR. The following results were obtained: styrene=21.3%, vinyl (1,2-polybutadiene, calculated on the butadiene fraction)=64.3% styrene block portion below 1%. The $T_g$ was found to be −20.3° C.

Low Molecular Weight Polymer C 4665 g cyclohexane, 70 g 2,2-ditetrahydrofurylether (DTHFP, polar agent), 517 g styrene were charge to a 10 l reactor, and heated up to 25° C. The impurities in the system were titrated by stepwise addition of n-butyl lithium. Recognizing the endpoint, the polymerization was started by the addition of 117 g n-butyl lithium (as solution in cyclohexane, 3.137 mol/kg solution). The temperature of the polymerization mixture rose due to the polymerization heat to 40° C. within 30 minutes. The living polymer chains were terminated with methanol. The molecular weight was determined as polystyrene equivalents to $M_n$ 1357 g/mol and $M_w$ 1719 g/mol. The $T_g$ was found to be 23.5° C.

Low Molecular Weight Polymer D 4599 g cyclohexane, 97 g DTHFP, 511 g styrene were charged to a 10 l reactor, and heated up to 25° C. The impurities in the system were titrated by stepwise addition of n-butyl lithium. Recognizing the endpoint, the polymerization was started by the addition of the 163 g n-butyl lithium (as solution in cyclohexane, 3.137 mol/kg solution). The temperature of the polymerization mixture rose due to the polymerization heat to 40° C. within 30 minutes. The living polymer chains were terminated with methanol. The molecular weight was determined as polystyrene equivalents to $M_n$ 1074 g/mol and $M_w$ 1452 g/mol. The $T_g$ was found to be 20.1° C.

Low Molecular Weight Polymer E 4492 g cyclohexane, 104 g DTHFP, 176.5 g n-butyl lithium (as solution in cyclohexane, 3.153 mol/kg solution) were charged to a 10 l reactor, and heated up to 250° C. 613.8 g styrene was charged over 60 minutes for polymerization of the oligomer. The temperature of the polymerization mixture rose due to the polymerization heat to 40° C. within 30 minutes. The living polymer chains were terminated with methanol after further 60 minutes. The molecular weight was determined as polystyrene equivalents to $M_n$ 1118 g/mol and $M_w$ 1233 g/mol. The $T_g$ was found to be 20.3° C.

Low Molecular Weight Polymer F 4514 g cyclohexane, 134 g DTHFP, 228 g n-butyl lithium (as solution in cyclohexane, 3.153 mol/kg solution) were charged to a 10 l reactor, and heated up to 25° C. 503 g styrene was charged over 60 minutes for polymerization of the oligomer. The temperature of the polymerization mixture rose due to the polymerization heat to 40° C. within 30 minutes. The living polymer chains were terminated with methanol after further 60 minutes. The molecular weight was determined as polystyrene equivalents to $M_n$ 796 g/mol and $M_w$ 876 g/mol. The $T_g$ was found to be −1.6° C.

Preparation of Polymer Blends

Polymer blends according to the present invention were prepared using the polymer solutions, as described above.

SSBR 1 (Comparative)

Polymer solution of polymer A was mixed with TDAE oil to obtain a polymer consisting of 77 percent by weight polymer A and 23 percent by weight TDAE. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 2 (Comparative)

Polymer solution of polymer A was mixed with TDAE oil to obtain a polymer consisting of 87 percent by weight polymer A and 13 percent by weight TDAE. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 3

The polymer solution of polymer A was mixed with the polymer solution of polymer E to obtain a polymer consisting of 77 percent by weight polymer A and 23 percent by weight polymer E. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 4

The polymer solution of polymer A was mixed with the polymer solution of polymer F to obtain a polymer consisting of 77 percent by weight polymer A and 23 percent by weight polymer F. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 5

The polymer solution of polymer B was mixed with the polymer solution of polymer C to obtain a polymer consisting of 77 percent by weight polymer B and 23 percent by weight polymer C. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 6

The polymer solution of polymer B was mixed with the (i) polymer solution of polymer C and (ii) aromatic TDAE oil to obtain a polymer consisting of 69 percent by weight polymer B, 20.7 percent by weight polymer C and 10.3 percent by weight TDAE oil. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

SSBR 7

The polymer solution of polymer B was mixed with the (i) polymer solution of polymer C and (ii) aromatic TDAE oil to obtain a polymer consisting of 64.5 percent by weight polymer B 19.4 percent by weight polymer C and 16.1 percent by weight TDAE oil. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

Preparation of Polymer Compositions and the Corresponding Vulcanizates Via 2-step Compounding/crosslinking Polymer compositions according to the invention were prepared using the solution styrene butadiene polymer (SSBR) materials described above. The polymer compositions were compounded by kneading according to the formulations shown in Table 1 in a standard two-step compound recipe with silica as filler in an internal lab mixer comprising a Banbury rotor type with a total chamber volume of 370 cm³.

The reagents used are as follows:

TABLE 1

Compound Formulations.

| Mixing: Stage | | | | Formulation | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| | | | | Comparison/Example | | | | | | | | | | |
| | | | | Com. 1 | Com. 2 | Ex. 1 | Ex. 2 | Ex. 3 | Ex. 4 | Com. 3 | Com. 4 | Ex. 5 | Ex. 6 | Com. 5 |
| 1 | SSBR Type: | | | SSBR1 | SSBR2 | SSBR3 | SSBR4 | SSBR5 | SSBR5 | SSBR5 | SSBR5 | SSBR5 | SSBR6 | SSBR7 |
| | Amount[a] | phr | | 80 | 80 | 80 | 80 | 80 | 80 | 80 | 80 | 80 | 80 | 80 |
| | Buna ® cis 132-Schkopau[1] | phr | | 20 | 20 | 20 | 20 | 20 | 20 | 20 | 20 | 20 | 20 | 20 |
| | Silica (Ultrasil 7000GR)[2] | phr* | | 80 | 80 | 80 | 80 | 80 | 80 | 80 | 80 | 80 | 80 | 80 |
| | Silane (Si 75 ®)[3] | phr* | | 6.9 | 6.9 | 6.9 | 6.9 | 6.9 | 6.9 | 6.9 | 6.9 | 6.9 | 6.9 | 6.9 |
| | Stearic acid[4] | phr* | | 1 | 1 | 1 | 1 | 1 | 1 | 1 | 1 | 1 | 1 | 1 |
| | Zinc oxide[5] | phr* | | 2.5 | 2.5 | 2.5 | 2.5 | 2.5 | 2.5 | 2.5 | 2.5 | 2.5 | 2.5 | 2.5 |

TABLE 1-continued

Compound Formulations.

| Mixing: Stage | | | | Formulation | | | | | | | | | |
|---|---|---|---|---|---|---|---|---|---|---|---|---|---|
| | | | | 1 | 2 | 3 | 4 | 5 | 6 | 7 | 8 | 9 | 10 | 11 |
| | | | | Comparison/Example | | | | | | | | | |
| | | | | Com. 1 | Com. 2 | Ex. 1 | Ex. 2 | Ex. 3 | Ex. 4 | Com. 3 | Com. 4 | Ex. 5 | Ex. 6 | Com. 5 |
| | Antioxidant (Dusantox ® 6PPD)[6] | phr* | 2 | 2 | 2 | 2 | 2 | 2 | 2 | 2 | 2 | 2 | 2 |
| | Wax Antilux 654[7] | phr* | 1.5 | 1.5 | 1.5 | 1.5 | 1.5 | 1.5 | 1.5 | 1.5 | 1.5 | 1.5 | 1.5 |
| | Other ingredients: | | | | | | | | | | | | |
| | Polymer D | phr* | — | 15 | — | — | — | — | — | — | — | — | — |
| | TDAE oil (aromatic oil) | phr* | — | — | — | — | 0 | 5 | 10 | 15 | — | — | — |
| 2 | Sulfur[8] | phr* | 1.4 | 1.4 | 1.4 | 1.4 | 1.4 | 1.4 | 1.4 | 1.4 | 1.4 | 1.4 | 1.4 |
| | Accelerator (TBBS)[9] | phr* | 1.7 | 1.7 | 1.7 | 1.7 | 1.5 | 1.5 | 1.5 | 1.5 | 1.5 | 1.5. | 1.5 |
| | Accelerator (DPG)[10] | phr* | 2 | 2 | 2 | 2 | 1.5 | 1.5 | 1.5 | 1.5 | 1.5 | 1.5. | 1.5 |

[a]Amount given without extender oil resp. low molecular weight polymer;
*phr = parts per hundred rubber, based on sum weight of the solution styrene butadiene copolymer (SSBR without extender oil) and high cis 1,4-polybutadiene (Buna ® cis 132-Schkopau);
[1]Styron Deutschland GmbH;
[2]Evonik Industries AG
[3]Bis(triethoxysilylpropyl)disulfan, sulfur equivalents per molecule: 2.35; Evonic Industries AG;
[4]Cognis GmbH;
[5]Grillo-Zinkoxid GmbH;
[6]N-(1,3-dimethylbutyl)-N'-phenyl-1,4-benzenediamine, Duslo, a.s.;
[7]Light & ozone protective wax, Rhein Chemie Rheinau GmbH
[8]Solvay AG;
[9]N-tert-Butyl-2-benzothiazyl-sulfenamide; Rhein Chemie Rheinau GmbH;
[10]Diphenylguanidine, Vulkacit DZ/EG-C, Lanxess AG The first mixing step was performed with a filling degree of 72% using an initial temperature of 50° C. After adding the polymer composition, the filler and all other ingredients described in the formulations for step 1, the rotor speed of the internal mixer is controlled to reach a temperature range between 145° C.-160° C. for up to 4 minutes, so that the silanization reaction can occur. The total mixing time for the first step is 7 min. After dumping the compound, the mixture is cooled down and stored for relaxing before adding the curing system in the second mixing step.

The second mixing step was done in the same equipment by using a fill factor of 69% at an initial temperature of 50° C. The compound from first mixing step, sulphur as vulcanizing agent and the accelerators DPG and TBBS were added and mixed for a total time of 3 min.

The resulting vulcanizates were investigated regarding their vulcanizate performance.

Results

VOC Emission of the Polymer Blends:

The results for the investigation of the VOC emission are given in the following Table 2. The polymer blends according to the invention show a significant improved VOC emission, i.e. a higher start temperature of mass loss and a lower mass loss up to 300° C.

TABLE 2

VOC emission of polymer blends.

| | Start temperature of mass loss | Mass loss [%] from T, initial up to | |
|---|---|---|---|
| | T, initial [° C.] | 300° C. | 350° C. |
| SSBR1 (comp.) | 150 | 7.8 | 17.4 |
| SSBR3 | 250 | 0.3 | 2.1 |
| SSBR4 | 200 | 1.4 | 5.2 |

Performance of the Crosslinked Polymer Compositions (Vulcanizates):

Examples 1 and 2 vs. Comparison 1 and 2

Next, the key performance attributes of the crosslinked polymer compositions (vulcanizates) according to the invention were analysed. The results of the corresponding tests are shown in Table 3.

TABLE 3

Key performance attributes of the crosslinked rubber compositions.

| | | Formulation | | | |
|---|---|---|---|---|---|
| | | 1 | 2 | 3 | 4 |
| | | Comparison/Example | | | |
| | Unit | Com. 1 | Com. 2 | Ex. 1 | Ex. 2 |
| Tensile strength | Mpa | 24.3 | 26.4 | 28.9 | 27.8 |
| DIN abrasion | cm$^3$ | 130 | 127 | 126 | 136 |
| HBU sample | ° C. | 113 | 114 | 112 | 116 |
| tan δ @ −10° C. | | 0.657 | 0.808 | 0.950 | 0.919 |
| tan δ @ 0° C. | | 0.445 | 0.547 | 0.741 | 0.630 |
| tan δ @ 60° C. | | 0.164 | 0.174 | 0.155 | 0.162 |
| tan δ @ 0° C./ tan δ 60° C. | | 2.718 | 3.135 | 4.787 | 3.892 |
| Grip/rolling resistance index | | 100 | 115 | 176 | 143 |

It was found that the addition of low molecular weight polystyrene (15 phr of polymer D) during compounding in the mixing process with a conventional aromatic oil extended high molecular weight SSBR results in a better wet grip, as shown by the higher tan δ at 0° C. (see comparison 2: tan δ@ 0° C.=0.547), as compared to a similar conventional aromatic oil extended high molecular weight SSBR without additional low molecular weight polystyrene (see comparison 1: tan δ @ 0° C.=0.445). Moreover, the ratio of tan δ at 0° C. and tan δ of 60° C. is 3.135 (see comparison 2) and the resulting grip/rolling resistance index is improved (see comparison 1 having a grip/rolling resistance index which was set to 100 vs. comparison 2 having a higher grip/rolling resistance index of 115). In addition, the tensile strength of comparison 2 is improved, as compared to comparison 1. However, this is also associated with a higher rolling resistance, i.e. higher fuel consumption and carbon dioxide emission, as shown by the higher tan δ at 60° C. (see comparison 2: tan δ@ 60° C.=0.174 vs. comparison 1: tan δ@ 60° C.=0.164, an increase of 6%).

In contrast, example 1 and 2 which both comprise the inventive polymer blend, i.e. the low molecular weight polystyrene was added to the SSBR before compounding, lead to a significantly improved wet grip performance, as shown by the higher tan δ values at 0° C. of more than 0.6, and a lower rolling resistance, as shown by the lower tan δ values at 60° C. of 0.155 to 0.162 (improvement of 1 to 6%). In addition the ratio of tan δ at 0° C. and tan δ at 60° C. and the resulting grip/rolling resistance index as compared to comparison 1 is higher than 140, i.e. significantly improved. Similarly, an improved tensile strength at break of >27 MPa is observed for examples 1 and 2.

Thus, providing a polymer blend according to the invention, as defined in claim 1, leads to a better balance of the key performance attributes of the resulting vulcanizates as compared to (i) conventional oil extended SSBR (comparison 1) and (ii) conventional oil extended SSBR which is compounded with low molecular weight polystyrene (polymer D) and conventional additives for compounding/vulcanization (comparison 2).

Examples 3 and 4 vs. Comparison 3 and 4

It was next investigated, whether the addition of an aromatic extender oil during compounding (for adjusting the compound viscosity) influences the key performance attributes of the resulting vulcanizates. This evaluation was performed with functionalized high molecular weight SSBR (see SSBR5 above). Especially in case of functionalized SSBR, the compound viscosities are usually relatively high due to the reaction of the functionalized polymer chains with the silica. The compound formulations are also given in Table 1. The results of the tests are shown in Table 4 below.

As shown in Table 4 above, a polymer composition comprising the polymer blend according to the invention, i.e. consisting of either (a) high molecular weight SSBR and (b) low molecular weight polystyrene (see example 3, formulation 5); or comprising the polymer blend according to the invention, and 5 phr free aromatic extender oil (see example 4, formulation 6), leads to a similar performance with respect to the wet grip, as represented by similar tan δ values at 0° C., the rolling resistance (tan δ at 60° C.) and the ratio of tan δ at 0° C. and tan δ at 60° C. as well as the resulting grip/rolling resistance index and DIN abrasion (see example 3: 132 mm$^3$ vs. example 4: 131 mm$^3$). Further, as expected, the compound Mooney viscosity of the polymer composition according to the invention comprising 5 phr free aromatic extender oil polymer (example 4, formulation 6) is only 116.4 MU, i.e. lower, as compared to example 3 (formulation 5) having a compound Mooney viscosity of 142.9 MU.

Increasing the amount of added free aromatic extender oil during compounding in the mixer to 10 phr, when formulating an inventive polymer blend (SSBR 5), leads to a significant decrease of the compound Mooney viscosity (see comparison 3: 101.6 MU), as expected, but still results in a similar dynamic performance (see comparison 3: tan δ at 0° C.=0.7390, tan δ at 60° C.=0.1397, the ratio of tan δ at 0° C. and tan δ at 60° C.=5.291, grip/rolling resistance index=100). However, the observed abrasion resistance is significantly deteriorated, as shown by a DIN abrasion of 156 mm$^3$. This polymer composition is outside of the inventive range.

A further increase of added free aromatic extender oil during compounding in the mixer to 15 phr, when formulating an inventive polymer blend (SSBR 5), leads to an even more significant decrease of the compound Mooney viscosity (see comparison 4: 91.5 MU), as expected. Even though an improved rolling resistance is observed (see tan δ at 60° C.=0.1232 for comparison 4), a significant deteriorated abrasion resistance, as shown by the DIN abrasion of as high as 179 mm$^3$ (comparison 3, formulation 8), and a significant deteriorated wet grip performance, as represented by a tan δ value at 0° C. of 0.4361, are also detectable. Similarly, the ratio of tan δ at 0° C. and tan δ at 60° C. is 3.5408 and the resulting grip/rolling resistance index is only 67%.

TABLE 4

Key performance attributes of the crosslinked rubber compositions.

| | | Formulation | | | |
|---|---|---|---|---|---|
| | | 5 | 6 | 7 | 8 |
| | | Comparison/Example | | | |
| | Unit | Ex. 3 | Ex. 4 | Com. 3 | Com. 4 |
| Compound Mooney CML1 + 4 (100° C.) | MU | 142.9 | 116.4 | 101.6 | 91.5 |
| Tensile strength | Mpa | 21.5 | 21.6 | 22.1 | 20.8 |
| DIN abrasion | cm$^3$ | 132 | 131 | 156 | 179 |
| HBU sample | ° C. | 111.3 | 111.4 | 109.7 | 116.4 |
| tan δ @ −10° C. | | 0.8592 | 0.9167 | 0.9184 | 0.7392 |
| tan δ @ 0° C. | | 0.7568 | 0.7321 | 0.7390 | 0.4361 |
| tan δ @ 60° C. | | 0.1425 | 0.1337 | 0.1397 | 0.1232 |
| tan δ @ 0° C./tan δ 60° C. | | 5.3094 | 5.4748 | 5.2910 | 3.5408 |
| Grip/rolling resistance index | | 100 | 103 | 100 | 67 |

Thus, addition of free extender oil in the compounding in an amount of 10 phr or less is possible without basically influencing the overall balance of the key performance attributes.

Examples 5 and 6

Alternatively, it is possible to incorporate the aromatic extender oil in the polymer solution of the new SSBR in an amount up to 15 parts per hundred high molecular polymer (phr), more preferably up to 10 phr, and recover the new SSBR as polymer blend (see example 6, formulation 10). Formulation 10 contains SSBR 6, i.e. high molecular weight SSBR (polymer A), low molecular weight polystyrene (polymer C) and 10.3 percent by weight conventional extender oil TDAE (see Table 1 above). Use of said polymer blend for compounding and crosslinking of the resulting mixture, as described above, results in a reduced compound Mooney viscosity and same key performance attributes (Tables 1 and 5) versus the polymer blend used in formulation 9 comprising 77% high molecular weight SSBR (polymer A) and 23% low molecular weight polystyrene (polymer C). The VOC emission is still reduced, because of the reduced amount of conventional oil (37.5 phr are usual amounts).

TABLE 5

Key performance attributes of the crosslinked rubber compositions.

| | | Formulation | |
| --- | --- | --- | --- |
| | Unit | 9 Example 5 | 10 Example 6 |
| Compound Mooney CML1 + 4 (100° C.) | MU | 141.0 | 103.9 |
| Tensile strength | Mpa | 21.1 | 18.8 |
| DIN abrasion | mm³ | 120 | 130 |
| HBU RT sample | ° C. | 112.1 | 107.1 |
| tan δ @ −10° C. | | 0.841 | 0.935 |
| tan δ @ 0° C. | | 0.698 | 0.734 |
| tan δ @ 60° C. | | 0.138 | 0.128 |
| (tan δ @ 0° C.)/(tan δ @ 60° C.) | | 5.053 | 5.735 |
| Grip/rolling resistance index | | 100 | 113 |

Color:

In addition, the polymer blends and/or polymer compositions according to the present invention are characterized by a translucent to white color, i.e. no intense cleaning is required after production of the polymer blends and/or polymer compositions according to the present invention.

The invention claimed is:
1. A polymer blend, consisting of
(a) 60 to 96 percent by weight of an elastomeric polymer,
(b) 4 to 35 percent by weight of an aromatic hydrocarbon polymer, and optionally
(c) 0 to 13 percent by weight of one or more extender oil(s),
wherein the elastomeric polymer is obtainable by (I) anionic polymerization in the presence of a polymerization initiator in an organic solvent of (I-1) at least one conjugated diene monomer, or (I-2) at least one conjugated diene monomer and at least one of (x) one or more α-olefin monomer(s) or (y) at least one or more of an aromatic vinyl compound or (z) at least one of a vinylsilane compound, and optionally (II) modification of the polymer chain ends obtained in (I) by addition and reaction of at least one compound represented by any of formula (1) to formula (3) and/or formula (11) to formula (15), as defined below;

wherein the elastomeric polymer (a) has a number average molecular weight ($M_n$) of 400,000 to 2,000,000 g/mol, and a weight-average molecular weight ($M_w$) of 500,000 to 3,000,000 g/mol;

wherein the aromatic hydrocarbon polymer (b) has a number average molecular weight ($M_n$) of 250 to 1,500 g/mol, and a weight-average molecular weight ($M_w$) of 350 to 2,500 g/mol, and wherein the amounts of the components (a), (b) and (c) are based on the total weight of the polymer blend;

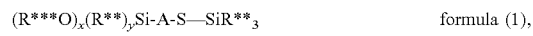
$$(R^{*}O)_x(R^{})_y\text{Si-A-S—SiR}^{**}{}_3 \qquad \text{formula (1),}$$

wherein each of $R^{}$ is independently selected from $C_1$-$C_{16}$ alkyl or alkylaryl; $R^{*}$ is independently selected from $C_1$-$C_4$ alkyl; A is selected from $C_6$-$C_{18}$ aryl, $C_7$-$C_{50}$ alkylaryl, $C_1$-$C_{50}$ alkyl and $C_2$-$C_{50}$ dialkylether; and optionally $R^{}$, $R^{*}$, or A may independently be substituted with one or more groups, selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl; x is an integer selected from 1, 2 and 3; y is an integer selected from 0, 1 and 2; provided that x+y=3;

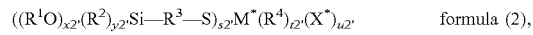
$$((R^1O)_{x2'}(R^2)_{y2'}\text{Si—R}^3\text{—S})_{s2'}M^*(R^4)_{t2'}(X^*)_{u2'} \qquad \text{formula (2),}$$

wherein $M^*$ is silicon or tin; x2' is an integer selected from 1, 2 and 3; y2' is an integer selected from 0, 1, and 2; wherein x2'+y2'=3; s2' is an integer selected from 2, 3 and 4; t2' is an integer selected from 0, 1 and 2; u2' is an integer selected from 0, 1 and 2; wherein s2'+t2'+u2'=4; $R^1$ is independently selected from hydrogen and ($C_1$-$C_6$) alkyl; $R^2$ is independently selected from ($C_1$-$C_{16}$) alkyl, ($C_7$-$C_{16}$) alkylaryl and ($C_7$-$C_{16}$) arylalkyl; $R^3$ is at least divalent and is independently selected from ($C_1$-$C_{16}$) alkyl, ($C_8$-$C_{16}$) alkylarylalkyl, ($C_7$-$C_{16}$) arylalkyl and ($C_7$-$C_{16}$) alkylaryl, and each group may be substituted with one or more of the following groups: tertiary amine group, silyl group, ($C_7$-$C_{18}$) aralkyl group and ($C_6$-$C_{18}$) aryl group; $R^4$ is independently selected from ($C_1$-$C_{16}$) alkyl and ($C_7$-$C_{16}$) alkylaryl; $X^*$ is independently selected from chloride, bromide and —$OR^{5*}$; wherein $R^{5*}$ is selected from ($C_1$-$C_{16}$) alkyl and ($C_7$-$C_{16}$) arylalkyl;

$$(R_IO)_{x1'}(R_{II})_{y1'}\text{Si—R}_{IV}\text{—S-E} \qquad \text{formula (3),}$$

wherein $R_I$ and $R_{II}$ are independently selected from $C_1$-$C_8$ alkyl or $C_1$-$C_4$ alkoxy, provided that at least one of $R_I$ and $R_{II}$ are $C_1$-$C_4$ alkoxy; x1' is an integer selected from 1, 2, and 3; y1' is an integer selected from 0, 1 and 2; $R_{IV}$ is selected from $C_1$-$C_8$ alkyl; and E is $R_V$ or of formula (3a):

formula (3a)

wherein $R_V$ is $C_1$-$C_6$ alkyl, $C_6$-$C_{12}$ aryl, $C_7$-$C_{16}$ alkylaryl, or $C_7$-$C_{16}$ arylalkyl;

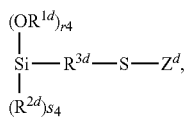

formula (11)

wherein each $R^{1d}$ is independently selected from $(C_1-C_{16})$ alkyl; each $R^{2d}$ is independently selected from $(C_1-C_{16})$ alkyl, $(C_6-C_{18})$ aryl and $(C_7-C_{18})$ alkylaryl; $R^{3d}$ is independently selected from divalent $(C_1-C_{16})$ alkyl, divalent $(C_6-C_{18})$ aryl, divalent $(C_7-C_{18})$ aralkyl and —$R^{4d}$—O—$R^{5d}$—, wherein $R^{4d}$ and $R^{5d}$ are independently selected from divalent $(C_1-C_6)$ alkyl; and $Z^d$ is independently selected from $(C_1-C_{16})$ alkyl, $(C_6-C_{18})$ aryl, $(C_7-C_{18})$ alkylaryl, (C=S)—S—$R^{6d}$, wherein $R^{6d}$ is selected from $(C_1-C_{16})$ alkyl, $(C_6-C_{18})$ aryl and $(C_7-C_{18})$ alkylaryl, and -$M^{1d}(R^{7d})_{c4}(R^{8d})_{d4}$, wherein $M^{1d}$ is silicon or tin, each $R^{7d}$ is independently selected from $(C_1-C_{16})$ alkyl, $(C_6-C_{18})$ aryl and $(C_7-C_{18})$ alkylaryl; each $R^{8d}$ is independently selected from —S—$R^{3d}$—Si(OR$^{1d}$)$_{r4}$(R$^{2d}$)$_{s4}$, wherein $R^{1d}$, $R^{2d}$ and $R^{3d}$ are as defined above, r4 is an integer independently selected from 1, 2 and 3 and $s_4$ is an integer independently selected from 0, 1 and 2, with r4+$s_4$=3; $c_4$ is an integer independently selected from 2 and 3; $d_4$ is an integer independently selected from 0 and 1; and $c_4+d_4$=3

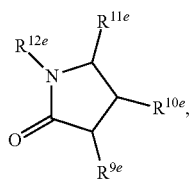

formula (12)

wherein $R^{9e}$, $R^{10e}$, $R^{11e}$ and $R^{12e}$ are independently selected from hydrogen, $(C_1-C_{16})$ alkyl, $(C_6-C_{16})$ aryl and $(C_7-C_{16})$ alkylaryl;

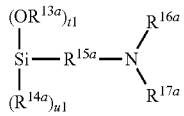

formula (13)

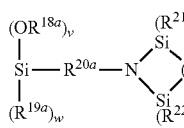

formula (14)

wherein each $R^{13a}$, $R^{14a}$, $R^{18a}$ and $R^{19a}$ is independently selected from $(C_1-C_{16})$ alkyl; $R^{15a}$ and $R^{20a}$ are independently selected from divalent $(C_1-C_{16})$ alkyl, divalent $(C_6-C_{18})$ aryl, divalent $(C_7-C_{18})$ alkylaryl and —$R^{24a}$—O—$R^{25a}$—, wherein $R^{24a}$ and $R^{25a}$ are independently selected from divalent $(C_1-C_6)$ alkyl; $R^{16a}$ and $R^{17a}$ are independently selected from $(C_1-C_{16})$ alkyl and —Si$(R^{26a})(R^{27a})(R^{28a})$, wherein $R^{26a}$, $R^{27a}$ and $R^{28a}$ are independently selected from $(C_1-C_{16})$ alkyl, $(C_6-C_{18})$ aryl and $(C_7-C_{18})$ alkylaryl; each $R^{21a}$ and $R^{22a}$ is independently selected from $(C_1-C_{16})$ alkyl, $(C_6-C_{18})$ aryl and $(C_7-C_{18})$ aralkyl; each $R^{23a}$ is independently selected from hydrogen and $(C_1-C_6)$ alkyl; $t_1$ and v are integers independently selected from 1, 2 and 3; u1 and w are integers independently selected from 0, 1 and 2; $t_1+u_1$=3; and v+w=3;

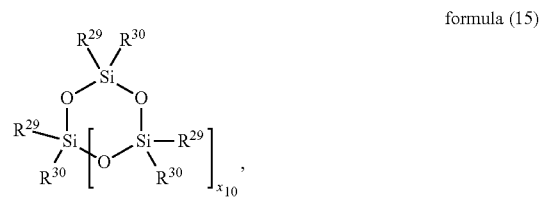

formula (15)

wherein each $R^{29}$ and $R^{30}$ is independently selected from $(C_1-C_{16})$ alkyl, $(C_6-C_{18})$ aryl, $(C_7-C_{18})$ alkylaryl and vinyl; and $x_{10}$ is an integer selected from 1 to 6.

2. The polymer blend according to claim 1, wherein the polymerization initiator is selected from the group consisting of n-BuLi, sec-BuLi, tert-BuLi, a compound represented by the following formula (6) to formula (10), as defined below, or Lewis base adducts thereof, and/or mixtures thereof

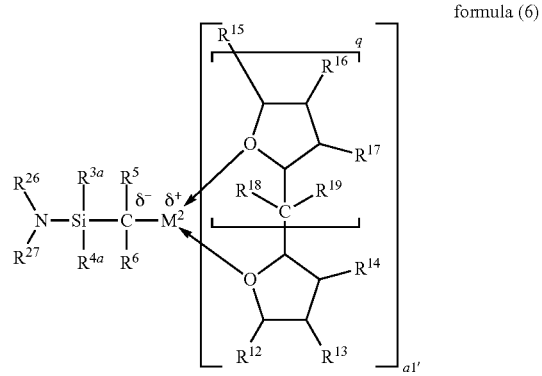

formula (6)

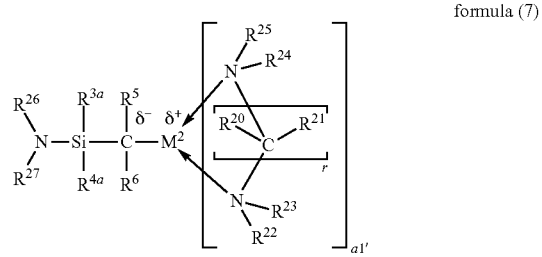

formula (7)

wherein $R^{3a}$ is independently selected from —N(R$^{28}$)R$^{29}$, $C_1-C_{18}$ alkyl, $C_6-C_{18}$ aryl and $(C_7-C_{18})$ aralkyl; $R^{4a}$ is independently selected from —N(R$^{30a}$)R$^{31a}$, $(C_1-C_{18})$ alkyl, $(C_6-C_{18})$ aryl and $(C_7-C_{18})$ aralkyl; $R^5$ and $R^6$ are each independently selected from hydrogen, $C_1-C_{18}$ alkyl, $C_6-C_{18}$ aryl and $C_7-C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently selected from hydrogen, $C_1-C_{18}$ alkyl, $C_6-C_{18}$ aryl and $C_7-C_{18}$ aralkyl; $R^{26}$, $R^{27}$, $R^{28}$, $R^{29}$, $R^{30a}$ and $R^{31a}$ are each independently selected from $C_1-C_{18}$ alkyl, $C_6-C_{18}$ aryl and $C_7-C_{18}$ aralkyl; q is selected from an integer of 1, 2, 3, 4 and 5; r is selected from an integer of 1, 2 and 3; and a1' is selected from an integer of 0 or 1;

formula (8)

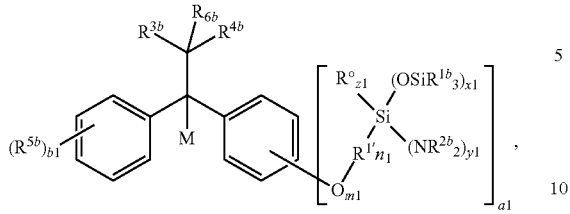

wherein each $R°$ is independently selected from $C_1$-$C_6$ alkyl, $C_2$-$C_6$ alkenyl, $C_7$-$C_{10}$ alkylaryl and $C_6$-$C_{10}$ aryl; $R^{1'}$ is an optionally substituted methylene group; each $R^{1b}$ is independently selected from $C_1$-$C_{10}$ alkyl, $C_7$-$C_{10}$ alkylaryl and $C_6$-$C_{10}$ aryl; each $R^{2b}$ is independently selected from $C_1$-$C_{10}$ alkyl, $C_7$-$C_{10}$ alkylaryl and $C_6$-$C_{10}$ aryl, wherein the $R^{2b}$ groups may be connected to each other to form a ring together with the Si-bonded nitrogen atom; $R^{3b}$ and $R^{4b}$ are each independently selected from hydrogen, methyl, ethyl, propyl, butyl and vinyl; each $R^{5b}$ is independently selected from $C_1$-$C_5$ alkyl, $C_7$ $C_{12}$ alkylaryl and $C_6$-$C_{12}$ aryl; $R_{6b}$ is selected from $C_1$-$C_6$ alkyl, phenyl and benzyl; M is lithium; a1≥1; b1≥0; $a_1$ +b1≥10; m 1=0 or 1; $n_1$ =0 to 12; x1 =0, 1 or 2; y1=1, 2 or 3; z1=0, 1 or 2; x1+y1+z1=3; or x1+y1+z1=2 when the silicon atom of the aminosilyl group is bonded twice to the benzene rings via groups $R^{1'}$or single bonds; provided that when m1=1, then n1=1 to 12, and when m1=0, then n1=0 and x1=1 or 2; wherein the aminosilyl group(s) may be bonded to any of the two benzene rings, plural aminosilyl groups may be different from each other, and the $R^{5b}$ group(s) may be bonded to any of the two benzene rings;

formula (9)

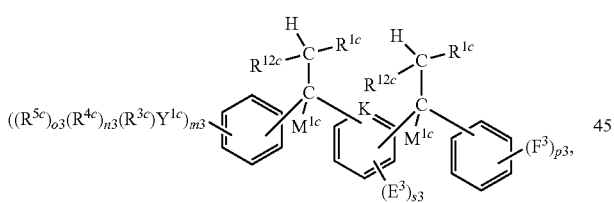

wherein each $M^{1c}$ is lithium; each $R^{1c}$ is independently selected from $C_1$-$C_{100}$ alkyl and $C_2$-$C_{100}$ alkenyl, optionally substituted with one or more $C_6$-$C_{12}$ aryl groups and optionally linked to the carbon atom C by up to 25 monomer units selected from conjugated diene monomers and aromatic vinyl compounds; each $R^{12c}$ is independently selected from hydrogen, ($C_1$-$C_{10}$) alkyl, ($C_6$-$C_{12}$) aryl and ($C_7$-$C_{18}$) alkylaryl; each $Y^{1c}$ is independently selected from a nitrogen atom, a sulfur atom and a silicon atom; $R^{3c}$, $R^{4c}$ and $R^{5c}$ are each independently selected from ($C_1$-$C_{18}$) alkyl, di($C_1$-$C_6$) alkyl amine only when $Y^{1c}$ is a silicon atom, ($C_6$-$C_{18}$) aryl, ($C_7$-$C_{18}$) alkylaryl and, when $Y^{1c}$ is not a silicon atom, —Si($R^{14c}$) ($R^{15c}$) ($R^{16c}$), wherein $R^{14c}$, $R^{15c}$ and $R^{16c}$ are each independently selected from ($C_1$-$C_{18}$) alkyl, ($C_6$-$C_{18}$) aryl and ($C_7$-$C_{18}$) alkylaryl; n3 and o3 are each an integer selected from 0 and 1; and n3+o3=1 when $Y^{1c}$=N, n3=o3=0 when $Y^{1c}$=S, and n3+o3=2 when $Y^{1c}$=Si; m3 is an integer selected from 0, 1, 2 and 3; K is selected from nitrogen and >C—H; each $E^3$ is independently selected from ($C_1$-$C_{18}$) alkyl, ($C_6$-$C_{18}$) aryl, ($C_7$-$C_{18}$) alkylaryl, and —$Y^{3c}(R^{9c})(R^{10c})_{t3}$ $(R^{11c})_{u3}$, wherein $Y^{3c}$ is selected from a nitrogen atom, a sulfur atom and a silicon atom; $R^{9c}$, $R^{10c}$ and $R^{11c}$ are each independently selected from ($C_1$-$C_{18}$) alkyl, di($C_1$-$C_6$) alkyl amine only when $Y^{3c}$ is a silicon atom, ($C_6$-$C_{18}$) aryl, ($C_7$-$C_{18}$) alkylaryl, and, when $Y^{3c}$ is not a silicon atom, —Si($R^{20c}$) ($R^{21c}$) ($R^{22c}$), wherein $R^{20c}$, $R^{21c}$ and $R^{22c}$ are each independently selected from ($C_1$-$C_{18}$) alkyl, ($C_6$-$C_{18}$) aryl and ($C_7$-$C_{18}$) alkylaryl; $t_3$ and $u_3$ are each an integer selected from 0 and 1; and $t_3+u_3=1$ when $Y^{3c}$=N, $t_3=u_3=0$ when $Y^{3c}$=S, and $t_3+u_3=2$ when $Y^{3c}$=Si; s3 is an integer selected from 0, 1 and 2; each $F^3$ is independently selected from ($C_1$-$C_{18}$) alkyl, ($C_6$-$C_{18}$) aryl, ($C_7$-$C_{18}$) alkylaryl, and —$Y^{2c}$ $(R^{6c})(R^{7c})_{q3}(R^{8c})_{r3}$, wherein $Y^{2c}$ is selected from a nitrogen atom, a sulfur atom and a silicon atom; $R^{6c}$, $R^{7c}$ and $^{8c}$ are each independently selected from ($C_1$-$C_{18}$) alkyl, di($C_1$-$C_{18}$) alkyl amine only when $Y^{2c}$ is a silicon atom, ($C_6$-$C_{18}$) aryl, ($C_7$-$C_{18}$) alkylaryl and, when $Y^{2c}$ is not a silicon atom, —Si ($R_{17c}$) ($R^{18c}$) (R19c), wherein $R^{17c}$, $R^{18c}$ and $R^{19c}$ are each independently selected from ($C_1$-$C_{18}$)$^{alkyl}$, ($C_6$-$C_{18}$) aryl and ($C_7$-$C_{18}$) alkylaryl; $q^3$ and $r_3$ are each an integer selected from 0 and 1; and $q_3+r_3=1$ when $y^{2c}$=N, $q_3=r_3=0$ when $Y^{2c}$=S, and $q_3+r_3=2$ when $Y^{2c}$=Si; $p_3$ is an integer selected from 0, 1, 2 and 3;

formula (10)

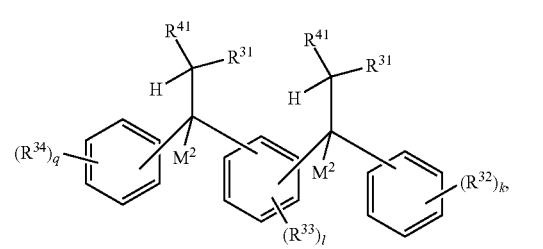

wherein each $R^{31}$ is independently selected from hydrogen, ($C_1$-$C_{10}$) alkyl, ($C_6$-$C_{12}$) aryl and ($C_7$-$C_{18}$) aralkyl; each $R^{32}$, $R^{33}$ and $R^{34}$ is independently selected from hydrogen, ($C_1$-$C_{18}$) alkyl and ($C_1$-$C_{18}$) alkoxy; each $R^{41}$ is independently selected from ($C_1$-$C_{100}$) alkyl and ($C_2$-$C_{100}$) alkenyl, wherein each $R^{41}$ is optionally substituted with one to three ($C_6$-$C_{12}$) aryl groups and is optionally bonded to the skeleton of formula (10) via an oligomer chain composed of up to 25 monomer units selected from conjugated dienes; $M^2$ is lithium; and k, l and q are integers independently selected from 0, 1, 2 and 3.

3. The polymer blend according to claim 1, wherein
(3.a) the conjugated diene monomer is selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene; and/or
(3.b) the α-olefin monomer or the aromatic vinyl compound or the vinylsilane compound is selected from styrene, 2-methylstyrene, 3-methylstyrene, 4-methylstyrene, 2,4-dimethylstyrene, 2,4,6-trimethylstyrene, α-methylstyrene, stilbene, 2,4-diisopropylstyrene,4- tert-butylstyrene, vinyl benzyl dimethylamine, (4-vinylbenzyl)dimethyl am inoethyl ether, N,N-dimethylaminoethyl styrene, N,N-bis-(trialkylsilyl)aminostyrene, tert-butoxystyrene, vinylpyridine, divinylbenzene, a vinylsilane compound of the following formula (4) or formula (5), and/or mixtures thereof;

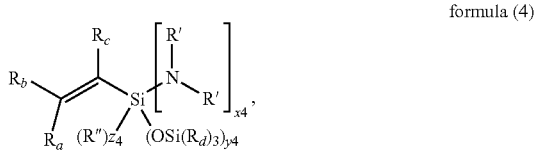

formula (4)

wherein $R_d$ is independently selected from $C_1$-$C_{18}$ hydrocarbyl; R" is selected from $C_1$-$C_6$ hydrocarbyl; $R_a$, $R_b$, and $R_c$ are independently selected from hydrogen, methyl, ethyl and vinyl; $x_4$ and $y_4$ are independently integers selected from 1 and 2; $z_4$ is an integer selected from 0 and 1; and $x_4+y_4+z_4=3$; R' is independently selected from $C_1$-$C_{12}$ alkyl, $C_2$-$C_{12}$ alkenyl, $C_6$-$C_{18}$ aryl, $C_7$-$C_{18}$ alkylaryl, and tri($C_1$-$C_6$ alkyl, $C_6$-$C_{12}$ aryl or $C_7$-$C_{18}$ (alkylaryl)silyl, wherein the two R' groups may be connected to form a ring and the ring may contain, further to the Si—bonded nitrogen atom, one or more of an oxygen atom, a nitrogen atom, an >N($C_1$-$C_6$ alkyl) group and a sulfur atom; and one R' may be —Si($CR_c$=$CR_aR_b$)($OSi(R_d)_3$)$_{y4}$(R")$_{z4}$, wherein $R_a$, $R_b$, $R_c$, $R_d$, R", y4 and z4 are independently as defined above and y4+z4=2;

formula (5), wherein $A^1$ is an organic group having at least two amino groups; each B is independently selected from a group —Si($R^{51}$)($R^{52}$)($R^{53}$), wherein $R^{51}$, $R^{52}$ and $R^{53}$ are each independently selected from vinyl, butadienyl, methyl, ethyl, propyl, butyl and phenyl, provided that at least one of $R^{51}$, $R^{52}$ and $R^{53}$ is selected from vinyl and butadienyl, wherein each group B is a substituent of an amino group of group $A^1$, at least two of the amino groups of group $A^1$ are each substituted with at least one group B; and $n_1$ is an integer of at least 2; and all amino groups in group $A^1$ are tertiary amino groups; or (3.c) the elastomeric polymer (a) obtained in step (I) is a butadiene-polymer or a styrene-butadiene-polymer.

4. The polymer blend according to claim 1, wherein
(4.a) in formula (1), each of R* are independently selected from methyl, ethyl, iso-propyl, n-propyl, n-butyl, iso-butyl, or tert-butyl; each of R are independently selected from $C_1$-$C_6$ alkyl, $C_6$-$C_{12}$ aryl, or $C_7$-$C_{10}$ alkylaryl; and A is —(CH$_2$)$_N$—, wherein N is an integer selected from 1, 2, 3, 4, 5 or 6; and/or
(4.b) in formula (2), M* is a silicon atom; $R^3$ is divalent and is ($C_1$-$C_{16}$) alkyl; X* is —OR$S^{5*}$, wherein $R^{5*}$ is selected from ($C_1$-$C_4$) alkyl; $R^1$, $R^2$, and $R^4$ are independently selected from ($C_1$-$C_4$) alkyl; s2' and t2' are each 2 and u2' is 0; and x2' is 2 and y2' is 1; and/or
(4.c) in formula (3), each of $R_I$ and $R_{II}$ are independently $C_1$-$C_4$ alkoxy; $R_{IV}$ is selected from $C_1$-$C_4$ alkyl; and E is of formula (3a).

5. The polymer blend according to claim 1, wherein the aromatic hydrocarbon polymer (b) is obtainable by polymerization of an aromatic monomer, selected from the group, consisting of 2-methylstyrene, 3-methylstyrene, 4-methylstyrene, 2,4-dimethylstyrene, 2,4,6-trimethylstyrene, α-methylstyrene, stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, divinylbenzene and its derivatives, coumarone, indene and/or mixtures thereof.

6. The polymer blend according to claim 1, wherein the aromatic hydrocarbon polymer (b) is a polystyrene-polymer.

7. A polymer composition, comprising the polymer blend according to claim 1.

8. The polymer composition according to claim 7, further comprising one or more filler(s) and optionally one or more vulcanizing agent(s).

9. The polymer composition according to claim 7, further comprising up to 10 percent by weight of one or more extender oil(s), based on the total weight of the polymer in the polymer composition.

10. A method for the preparation of a crosslinked elastomeric polymer, said method comprising the following steps:
(1) providing the polymer blend according to claim 1 or the polymer composition according to claim 7;
(2) adding one or more filler(s) and optionally one or more silane coupling agent(s) to provide a mixture; and compounding the mixture; and
(3) adding one or more vulcanizing agent(s) and optionally one or more vulcanizing accelerator(s) to the mixture of step (2) to provide a second mixture; and cross-linking the second mixture.

11. A crosslinked elastomeric polymer obtainable according to the method of claim 10.

12. An article comprising the crosslinked elastomeric polymer according to claim 11.

13. An article comprising the crosslinked elastomeric polymer according to claim 11, wherein the article is a tire, a tire tread, a tire side wall, a conveyer belt, a seal or a hose.

14. An article comprising the polymer composition according to claim 7.

15. An article comprising the polymer composition according to claim 7, wherein the article is a tire, a tire tread, a tire side wall, a conveyer belt, a seal or a hose.

16. A polymer kit, comprising (II.1) the polymer blend according to claim 1, or (II.2) the polymer composition according to claim 7.

* * * * *